United States Patent
Chen et al.

(10) Patent No.: US 11,076,529 B2
(45) Date of Patent: Aug. 3, 2021

(54) INTELLIGENT MOWING SYSTEM

(71) Applicant: Nanjing Chervon Industry Co., Ltd., Nanjing (CN)

(72) Inventors: Weipeng Chen, Nanjing (CN); Hongwei Wang, Nanjing (CN); Dezhong Yang, Nanjing (CN); Weibin Kou, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/874,964

(22) Filed: May 15, 2020

(65) Prior Publication Data

US 2020/0275605 A1 Sep. 3, 2020

Related U.S. Application Data

(63) Continuation of application No. PCT/CN2018/115986, filed on Nov. 16, 2018.

(30) Foreign Application Priority Data

Nov. 16, 2017 (CN) .......................... 201711135232.8
Nov. 24, 2017 (CN) .......................... 201711189993.1
(Continued)

(51) Int. Cl.
*A01D 34/00* (2006.01)
*G05D 1/02* (2020.01)
(Continued)

(52) U.S. Cl.
CPC ......... *A01D 34/008* (2013.01); *G05D 1/0044* (2013.01); *G05D 1/0088* (2013.01);
(Continued)

(58) Field of Classification Search
CPC .. A01D 34/008; G05D 1/0044; G05D 1/0088; G05D 1/0219; G05D 1/0274; G05D 1/0278
See application file for complete search history.

(56) References Cited

U.S. PATENT DOCUMENTS 8,954,216 B2    2/2015  Yazaki et al.
9,375,842 B2 *  6/2016  Shamlian ............. G05D 1/0219
                        (Continued)

FOREIGN PATENT DOCUMENTS

CN    106416587 A    2/2017
CN    106708033 A    5/2017
                (Continued)

OTHER PUBLICATIONS

ISA/CN, Int. Search Report issued on PCT application No. CN2018/115986, dated Feb. 18, 2019, 4 pages.

*Primary Examiner* — Alicia Torres
(74) *Attorney, Agent, or Firm* — Greenberg Traurig, LLP

(57) ABSTRACT

An intelligent mowing system includes a base station to receive at least one kind of satellite positioning signal sent by a satellite system at a fixed location and an intelligent lawn mower. A mobile station group is mounted on the intelligent lawn mower and communicated with the base station to receive at least one kind of satellite positioning signal sent by the satellite system during a walking process of the intelligent lawn mower. The mobile station group includes at least a first mobile station and a second mobile station arranged at intervals that determines the position of the intelligent lawn mower. A controller is configured to control the intelligent lawn mower to generally walk within a predetermined line width.

20 Claims, 22 Drawing Sheets

(30) Foreign Application Priority Data

Nov. 24, 2017 (CN) .......................... 201711190450.1
Jan. 31, 2018 (CN) .......................... 201810095259.7

(51) Int. Cl.
*G05D 1/00* (2006.01)
*A01D 34/78* (2006.01)
*A01D 69/02* (2006.01)
*A01D 101/00* (2006.01)

(52) U.S. Cl.
CPC ......... *G05D 1/0219* (2013.01); *G05D 1/0274* (2013.01); *G05D 1/0278* (2013.01); *A01D 34/78* (2013.01); *A01D 69/02* (2013.01); *A01D 2101/00* (2013.01); *G05D 2201/0208* (2013.01)

(56) References Cited

U.S. PATENT DOCUMENTS

| | | | | |
|---|---|---|---|---|
| 2016/0165795 A1* | 6/2016 | Balutis | ................ | G05D 1/0088 701/25 |
| 2018/0352731 A1* | 12/2018 | Hans | ................... | A01D 34/412 |
| 2019/0346848 A1* | 11/2019 | Zhou | ................... | G05D 1/0276 |
| 2019/0369640 A1* | 12/2019 | He | ......................... | G01S 19/48 |
| 2020/0093058 A1* | 3/2020 | Ritzer | ................ | A01B 69/008 |

FOREIGN PATENT DOCUMENTS

| | | |
|---|---|---|
| CN | 106717462 A | 5/2017 |
| EP | 2997808 B1 | 4/2017 |
| JP | 2010025872 A | 2/2010 |
| WO | 2016102141 A1 | 6/2016 |

\* cited by examiner

INTELLIGENT MOWING SYSTEM

RELATED APPLICATION INFORMATION

The present application claims the benefit of International Application Number PCT/CN2018/115986, filed on Nov. 16, 2018, through which this application claims the benefit of Chinese Patent Application No. 201711135232.8, filed on Nov. 16, 2017, Chinese Patent Application No. 201711190450.1, filed on Nov. 24, 2017, Chinese Patent Application No. 201711189993.1, filed on Nov. 24, 2017 and Chinese Patent Application No. 201810095259.7, filed on Jan. 31, 2018, in the SIPO (State Intellectual Property Office—Chinese Patent Office), each of which is incorporated herein by reference in its entirety.

FIELD

The present disclosure relates to an intelligent mowing system, in particular, to an intelligent mowing system with positioning function.

BACKGROUND

Nowadays, smart lawn mowers or robot lawn mowers are becoming increasingly popular among users. However, for existing smart lawn mowers, physical wires or physical electronic fences needs to be pre-arranged before outdoor mowing in order to define a mowable area so that the smart lawn mowers can perform mowing within the defined mowable area. If the mowable area has a large coverage or the mowable area is irregular, it is troublesome to arrange physical wires or physical electronic fences so user experience of the smart lawn mower will be significantly affected. In addition, existing smart lawn mower or robot lawn mower has a relatively large positioning precision variance, which has a great impact on the actual control of mowing path by the smart lawn mower.

If the mowable object contains a corner or is of an island shape, such as a flower bed, fencing or wiring for traditional smart lawn mower needs to include an acute arc angle, and a certain distance must be kept between the boundary wires, also a certain distance must be kept between the boundary wire and mowable area boundary, otherwise the lawn mower may leave out or cut exceed the predefined mowable area during the mowing process.

During the wiring or fencing process, the boundary wires need to be straightened, and no bending is allowed. Nails must be used between every certain distance to pin the boundary wire in order to keep the wire in a stretched state. Otherwise, the lawn mower may work abnormally, resulting in adverse consequences such as cutting out of range.

The electronic fences or physical wires used by traditional smart lawn mowers are closed wires with current passing through. While costing low, subjected to antenna effect, physical wires are easily affected by lightning and similar accidents, causing inaccurate positioning and thus increased failure probabilities of the mowing operations of the lawn mower. Electronic fences or physical wires exposed in the air are prone to damages from wind, rain and animals. If damages happen, re-wiring incurs extra costs.

SUMMARY

In order to solve the disadvantages of the prior art, the main object of the present disclosure is to provide an intelligent mowing system with higher precision in positioning and mowing.

Another object of the present disclosure is to provide an intelligent mowing system that can accurately perform operations along a preset path, thereby improving the efficiency of the intelligent mowing system, and effectively reducing the occurrence of repeat cut and miss cut.

In order to achieve the above main objectives, the present disclosure provides an example of an intelligent mowing system, including:
 a base station configured to receive at least one kind of satellite positioning signal sent by the satellite system at a fixed location; and
 an intelligent lawn mower, including:
 a cutting blade for cutting grass;
 a deck for supporting the cutting blade;
 at least one wheel rotatably supported by the deck;
 a first drive motor configured to provide a first torque to the at least one wheel;
 a second cut motor configured to provide a second torque to the cutting blade; and
 a display interface configured to display a mowing path in a map area;
 wherein the intelligent mowing system further includes a mobile station group mounted on the intelligent lawn mower and communicated with the base station, the mobile station group being used to receive at least one kind of satellite positioning signal sent by the satellite system during the walking process of the intelligent lawn mower, wherein the mobile station group includes at least a first mobile station and a second mobile station arranged at intervals, and the position of the intelligent lawn mower is determined by the first mobile station and the second mobile station arranged at intervals;
 a lawn mower position generation module configured to communicate with the display interface to selectively display the position of the intelligent lawn mower in the map area of the display interface; and
 a controller electrically connected to or communicated with the display interface and the lawn mower position generation module, the controller being configured to control the intelligent lawn mower to generally walk within the predetermined line width at least according to the relative positional relationship between the position of the intelligent lawn mower and the mowing path.

In a further example, the predetermined line width is greater than or equal to the distance between the first mobile station and the second mobile station.

In a further example, the intelligent mowing system includes a path calibration module. The path calibration module is communicationally connected to the lawn mower position generation module, and obtains the path offset state of the intelligent lawn mower based on the position information of the mobile station group and preset algorithms in the lawn mower position generation module.

In a further example, if the path calibration module determines that the position of the intelligent lawn mower does not conform to the mowing path, the state where the mobile station group is located within a predetermined line width of the mowing path is a direction offset state, the state where only one mobile station is located within the predetermined line width of the mowing path is a partial offset state, and the state where the mobile station group is located outside the predetermined line width of the mowing path is a complete offset state.

In a further example, the path calibration module stores an algorithm to control the intelligent lawn mower to slow down or stop traveling in the direction offset state, and calibrate the direction to the corresponding direction of the mowing path.

In a further example, the path calibration module stores an algorithm to control the intelligent lawn mower to slow down and change the traveling direction towards the mowing path in the complete offset state, and then perform a second calibration once switched to the direction offset state.

In a further example, the path calibration module stores an algorithm to control the intelligent lawn mower to slow down in the partial offset state, and then perform a second calibration or third calibration once switched to the direction offset state or the complete offset state.

In a further example, the path calibration module determines the direction offset state to be the online state, the converging state or the diverging state based on the position information of the intelligent lawn mower, and sets the calibration scheme for the online state to be speed down and calibrate direction and the calibration scheme for the converging state to be stop and calibrate direction, and the calibration scheme for the diverging state is to be stop and change direction and calibrate direction.

In a further example, when the path calibration module determines that the position of the intelligent lawn mower does not conform to the mowing path, calculate curve or straight line calibration path, and control the intelligent lawn mower to return to the mowing path.

In a further example, the path calibration module determines the path offset state of the intelligent lawn mower according to the angle or distance between the intelligent lawn mower and the mowing path.

In a further example, the path calibration module determines the path offset state of the intelligent lawn mower according to the relationship between the latitude and longitude coordinates of intelligent lawn mower and the latitude and longitude coordinates of the predetermined line width.

In a further example, the intelligent lawn mower further includes at least one position sensor. The at least one position sensor is communicationally connected to the controller, and detects the position information of the intelligent lawn mower. The at least one position sensor is selectively used in one or a combination of Gyro sensor, accelerometer, inertial measurement unit, barometer, magnetometer, and communication equipments.

In order to achieve the above main objectives, the present disclosure provides another example of an intelligent mowing system, including:

a base station configured to receive at least one kind of satellite positioning signal sent by the satellite system at a fixed location;

a mobile terminal provided with a display interface configured to display a mowing path in a map area; and an intelligent lawn mower, including:

a cutting blade for cutting grass;

a deck for supporting the cutting blade;

at least one wheel rotatably supported by the deck; and a drive motor configured to provide a first torque to the at least one wheel;

wherein the intelligent mowing system further includes a mobile station group mounted on the intelligent lawn mower and communicated with the base station, the mobile station group being used to receive at least one kind of satellite positioning signal sent by the satellite system during the walking process of the intelligent lawn mower, wherein the mobile station group includes at least a first mobile station and a second mobile station arranged at intervals, and the position of the intelligent lawn mower is determined by the first mobile station and the second mobile station arranged at intervals;

a lawn mower position generation module configured to communicate with a display interface of the mobile terminal to selectively display the position of the intelligent lawn mower in the map area of the display interface; and a controller electrically connected to or communicated with the display interface and the lawn mower position generation module, the controller being configured to control the intelligent lawn mower to generally walk within the predetermined line width at least according to the relative positional relationship between the position of the intelligent lawn mower and the mowing path.

In a further example, the predetermined line width is greater than or equal to the distance between the first mobile station and the second mobile station.

In a further example, the intelligent mowing system includes a path calibration module. The path calibration module is communicationally connected to the lawn mower position generation module, and obtains the path offset state of the intelligent lawn mower based on the position information of the mobile station group and preset algorithms in the lawn mower position generation module.

In a further example, if the path calibration module determines that the position of the intelligent lawn mower does not conform to the mowing path, the state where the mobile station group is located within a predetermined line width of the mowing path is a direction offset state, the state where only one mobile station is located within the predetermined line width of the mowing path is a partial offset state, and the state where the mobile station group is located outside the predetermined line width of the mowing path is a complete offset state.

In a further example, the path calibration module stores an algorithm to control the intelligent lawn mower to slow down or stop traveling in the direction offset state, and calibrate the direction to the corresponding direction of the mowing path.

In a further example, the path calibration module stores an algorithm to control the intelligent lawn mower to slow down and change the traveling direction towards the mowing path in the complete offset state, and then perform a second calibration once switched to the direction offset state.

In a further example, the path calibration module stores an algorithm to control the intelligent lawn mower to slow down in the partial offset state, and then perform a second calibration or third calibration once switched to the direction offset state or the complete offset state.

In a further example, the path calibration module determines the direction offset state to be the online state, the converging state or the diverging state based on the position information of the intelligent lawn mower, and sets the calibration scheme for the online state to be speed down and calibrate direction and the calibration scheme for the converging state to be stop and calibrate direction, and the calibration scheme for the diverging state is to be stop and change direction and calibrate direction.

In a further example, when the path calibration module determines that the position of the intelligent lawn mower does not conform to the mowing path, calculate curve or straight line calibration path, and control the intelligent lawn mower to return to the mowing path.

In a further example, wherein the path calibration module determines the path offset state of the intelligent lawn mower according to the angle or distance between the intelligent lawn mower and the mowing path.

In a further example, the path calibration module determines the path offset state of the intelligent lawn mower according to the relationship between the latitude and longitude coordinates of intelligent lawn mower and the latitude and longitude coordinates of the predetermined line width.

In a further example, the intelligent lawn mower further includes at least one position sensor. The at least one position sensor is communicationally connected to the controller, and detects the position information of the intelligent lawn mower. The at least one position sensor is selectively used in one or a combination of Gyro sensor, accelerometer, inertial measurement unit, barometer, magnetometer, and communication equipments.

In order to achieve the above main objectives, the present disclosure provides another example of an intelligent mowing system, including:
- a base station configured to receive at least one kind of satellite positioning signal sent by the satellite system at a fixed location; and
- an intelligent lawn mower, including:
- a cutting blade for cutting grass;
- a deck for supporting the cutting blade;
- at least one wheel rotatably supported by the deck; and
- a drive motor configured to provide a first torque to the at least one wheel;
- wherein the intelligent mowing system further includes a mobile station group mounted on the intelligent lawn mower and communicated with the base station, the mobile station group being used to receive at least one kind of satellite positioning signal sent by the satellite system during the walking process of the intelligent lawn mower, and the mobile station group includes at least a first mobile station and a second mobile station arranged at intervals, and the position of the intelligent lawn mower being determined by the first mobile station and the second mobile station arranged at intervals; and
- a controller configured to control the intelligent lawn mower to generally walk within the predetermined line width at least according to the relative positional relationship between the position of the intelligent lawn mower and the mowing path.

In a further example, the intelligent lawn mower further includes at least one position sensor. The at least one position sensor is communicationally connected to the controller, and detects the position information of the intelligent lawn mower. The at least one position sensor is selectively used in one or a combination of Gyro sensor, accelerometer, inertial measurement unit, barometer, magnetometer, and communication equipments.

In a further example, the predetermined line width is greater than or equal to the distance between the first mobile station and the second mobile station.

In a further example, the intelligent mowing system includes a path calibration module. The path calibration module is communicationally connected to the lawn mower position generation module, and obtains the path offset state of the intelligent lawn mower based on the position information of the mobile station group and preset algorithms in the lawn mower position generation module.

In a further example, if the path calibration module determines that the position of the intelligent lawn mower does not conform to the mowing path, the state where the mobile station group is located within a predetermined line width of the mowing path is a direction offset state, the state where only one mobile station is located within the predetermined line width of the mowing path is a partial offset state, and the state where the mobile station group is located outside the predetermined line width of the mowing path is a complete offset state.

In a further example, the path calibration module stores an algorithm to control the intelligent lawn mower to slow down or stop traveling in the direction offset state, and calibrate the direction to the corresponding direction of the mowing path.

In a further example, the path calibration module stores an algorithm to control the intelligent lawn mower to slow down and change the traveling direction towards the mowing path in the complete offset state, and then perform a second calibration once switched to the direction offset state.

In a further example, the path calibration module stores an algorithm to control the intelligent lawn mower to slow down in the partial offset state, and then perform a second calibration or third calibration once switched to the direction offset state or the complete offset state.

In a further example, the path calibration module determines the direction offset state to be the online state, the converging state or the diverging state based on the position information of the intelligent lawn mower, and sets the calibration scheme for the online state to be speed down and calibrate direction and the calibration scheme for the converging state to be stop and calibrate direction, and the calibration scheme for the diverging state is to be stop and change direction and calibrate direction.

In a further example, when the path calibration module determines that the position of the intelligent lawn mower does not conform to the mowing path, calculate curve or straight line calibration path, and control the intelligent lawn mower to return to the mowing path.

In a further example, the path calibration module determines the path offset state of the intelligent lawn mower according to the angle or distance between the intelligent lawn mower and the mowing path.

In a further example, the path calibration module determines the path offset state of the intelligent lawn mower according to the relationship between the latitude and longitude coordinates of intelligent lawn mower and the latitude and longitude coordinates of the predetermined line width.

DETAILED DESCRIPTION

The present disclosure will be described in detail below with reference to the drawings and examples.

Figure 1:
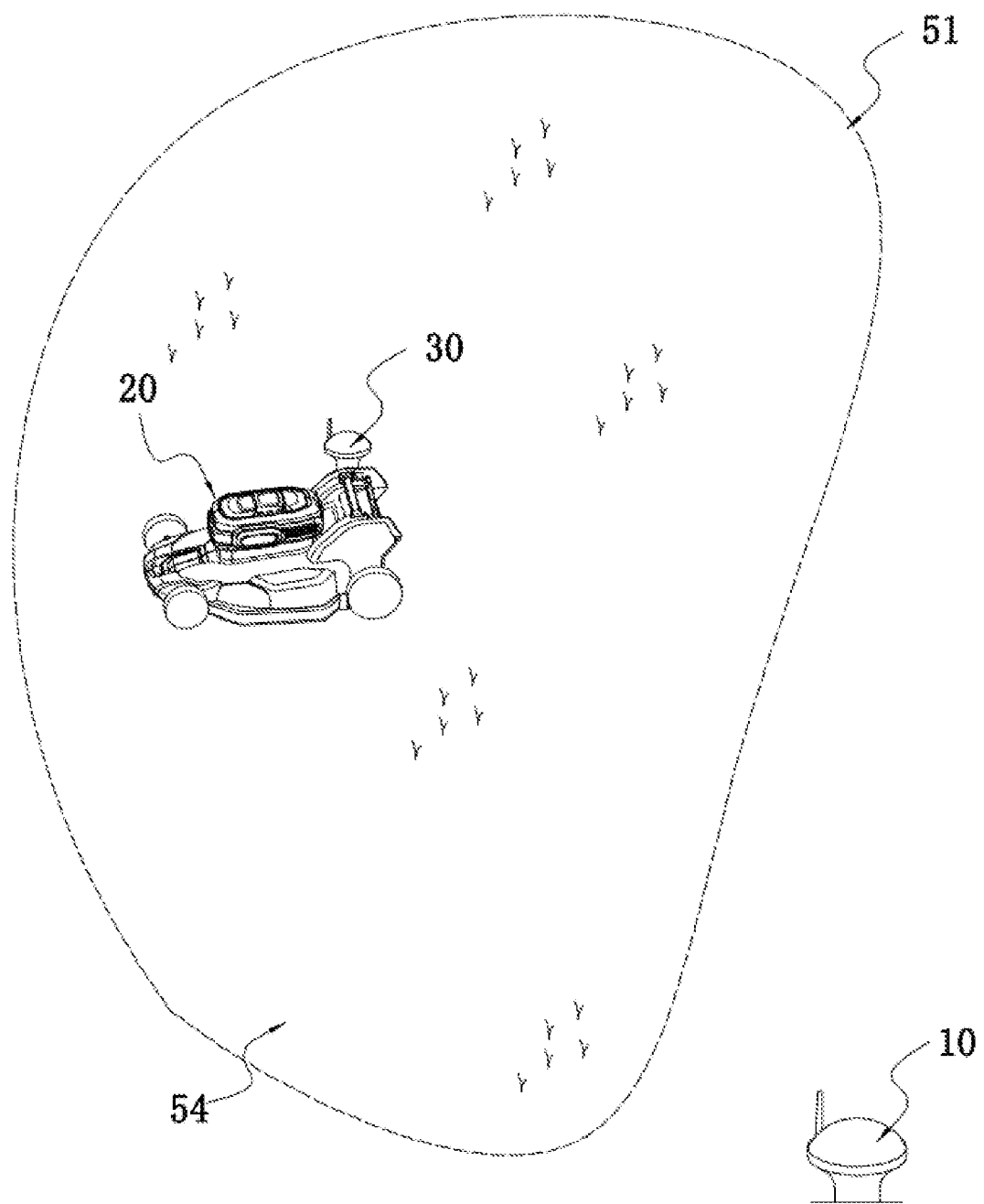
FIG. 1 is a schematic view of an example of an intelligent mowing system according to the present disclosure.

As shown in FIG. 1, according to an example of the present disclosure, an intelligent mowing system includes a base station 10, an intelligent lawn mower 20, and a mobile station 30 mounted on the intelligent lawn mower 20. The mobile station 30 moves together with the intelligent lawn mower 20 to capture the GNSS or GPS position of the intelligent lawn mower 20.

Figure 2:
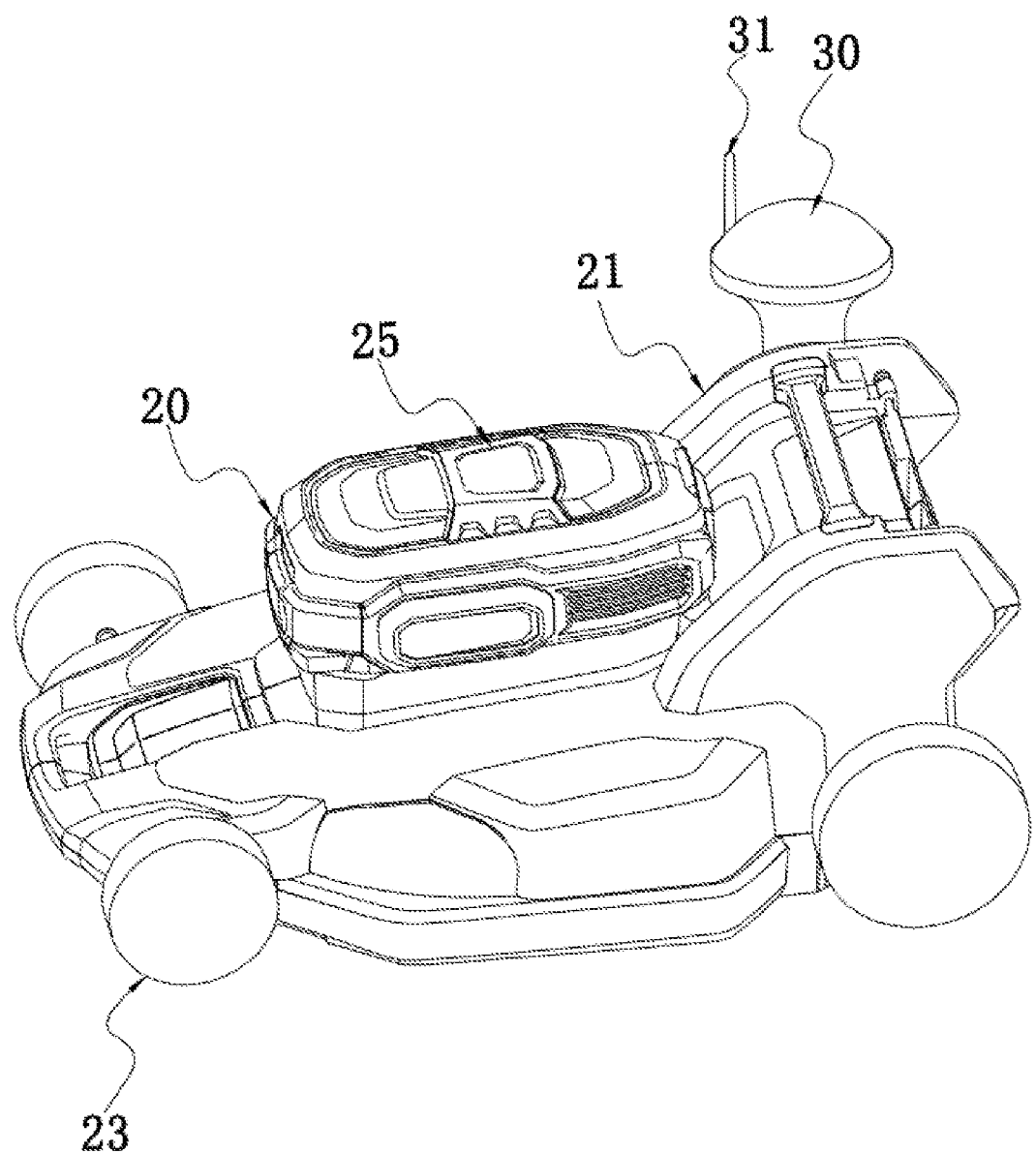
FIG. 2 is a perspective view of an example of an intelligent lawn mower according to the present disclosure.

Referring to FIG. 2, a schematic structural diagram of an example of an intelligent lawn mower is depicted. As shown in FIG. 2, the mobile station 30 includes a receiving antenna 31 for receiving a GNSS or GPS position signal from a satellite, and by which, the position of the intelligent lawn mower 20 can be determined. In an example, the GNSS or GPS position signal received by the mobile station 30 is represented as A1 (N1, E1), that is, the GNSS or GPS position A1 is represented by a longitude position and a latitude position. For example, if the obtained GNSS or GPS position A1 is at a longitude of 31°51' and a latitude of 118°48', then the GNSS or GPS position is represented as A1 (N 31°51', E 118°48'). In this way, the mobile station 30 captures the various GNSS or GPS positions during the movement of the intelligent lawn mower 20.

Figure 3:
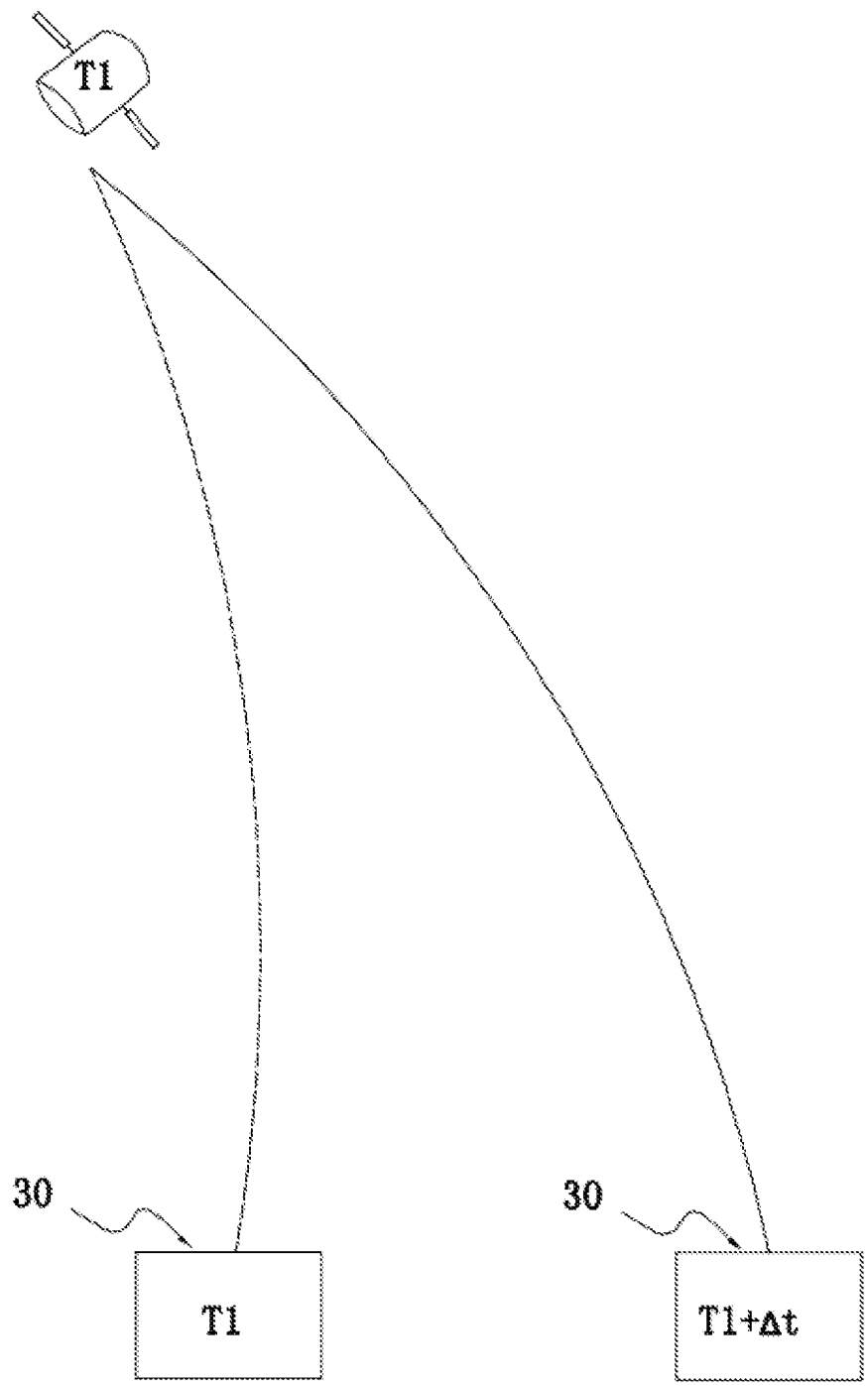
FIG. 3 is a schematic diagram of GNSS signal reception of an intelligent mowing system according to an example of the present disclosure.

FIG. 3 depicts a schematic diagram of GNSS signal reception of an intelligent mowing system, according to an example. The intelligent mowing system employs a global navigation satellite system (GNSS), which encompasses a plurality of satellite navigation systems. By collecting the position signals from multiple satellite navigation systems and processing them by algorithms, the actual GNSS position of the intelligent lawnmower 20 can be obtained.

Here, it should be noted that GNSS is a global navigation satellite system, which includes US GPS, Chinese Beidou, Russian GLONASS, EU GALILEO, regional systems such as Japan's QZSS and India's IRNSS, and enhanced systems such as the US's WASS, Japan's MSAS, and the European Union's EGNOS, GAGAN in India, and NIG-GOMSAT-1 in Nigeria. In other words, US GPS, Chinese Beidou, Russian GLONASS, EU GALILEO, regional systems such as Japan's QZSS and India's IRNSS, enhanced systems such as WASS in the United States, MSAS in Japan, EGNOS in the EU, GAGAN in India, and NIG-GOMSAT-1 and other major navigation systems are collectively referred to as GNSS.

The GNSS navigation system includes GPS navigation system. Sometimes problems occur with the GPS navigation system, but the GNSS navigation system is not affected by some GPS navigation system failure. In other words, in an example, the intelligent mowing system employing GNSS navigation system is not affected by bad or problematic signals of one or more of the navigation systems, and can accurately capture or acquire the position data to centimeter or millimeter level.

In an example, the base station 10 is mounted on the ground or mounted at a fixed spot. The mobile station 30 establishes communication with the base station 10.

As shown in FIG. 1 and FIG. 3, since the GNSS or GPS position signal received by the mobile station 30 on the intelligent lawn mower 20 may have a certain deviation, it is corrected by the GNSS or GPS position signal received by the base station installed on the ground or at a fixed spot, by which the GNSS or GPS position of the intelligent lawn mower 20 on the grass becomes more accurate. That is, in an example of the present disclosure, the actual position of the intelligent lawn mower 20 is derived from the mobile station GNSS or GPS position signal of the intelligent lawn mower 20, as well as the base station GNSS or GPS position signal for calibration.

For example, when the mobile station 30 on the lawn mower receives the GNSS or GPS position signal at time T1, the correcting GNSS or GPS position signal transmitted by the base station 10 to correct the GNSS or GPS position signal of the mobile station 30 is delayed by 1 s. As the 1 s time difference is negligible, it is considered that the GNSS or GPS position signal from the base station 10 can effectively correct the mobile station GNSS or GPS position signal on the intelligent lawn mower. Alternatively, the base station can send an estimated GNSS or GPS position signal of time T1+1 to the intelligent lawn mower 20 based on the real-time GNSS or GPS position signal at current time T1, then the mobile station 30 of the intelligent lawn mower 20 captures the estimated GNSS or GPS position signal at time T1+1. The GNSS or GPS position signal received at the mobile station 30 at time T1+1 is then corrected by the estimated GNSS or GPS position signal of time T1+1 transmitted from the base station to derive the actual GNSS or GPS position of the lawn mower. The actual GNSS or GPS position of the intelligent lawn mower 20 can be accurate to centimeters or millimeters with GNSS or GPS position signals of the mobile station 30 and GNSS or GPS position signal calibration of the base station 10.

Figure 4A:
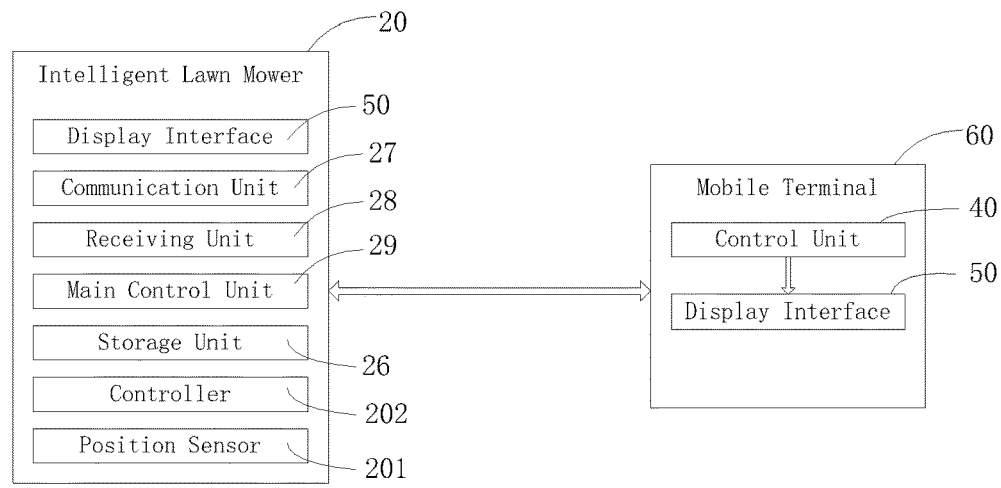
FIG. 4A is a schematic diagram of a structural framework of an intelligent mowing system according to an example of the present disclosure.
Figure 4B:
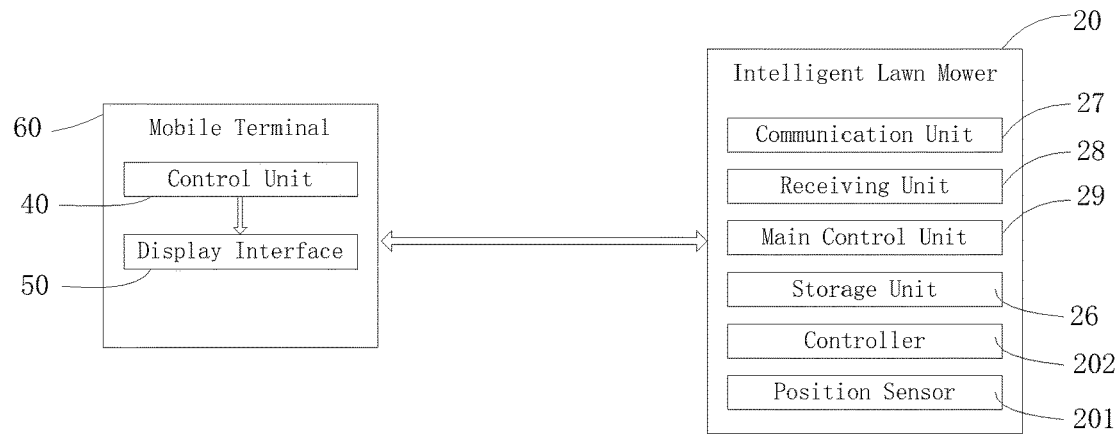
FIG. 4B is a schematic diagram of another structural framework of an intelligent mowing system according to an example of the present disclosure.
Figure 4C:
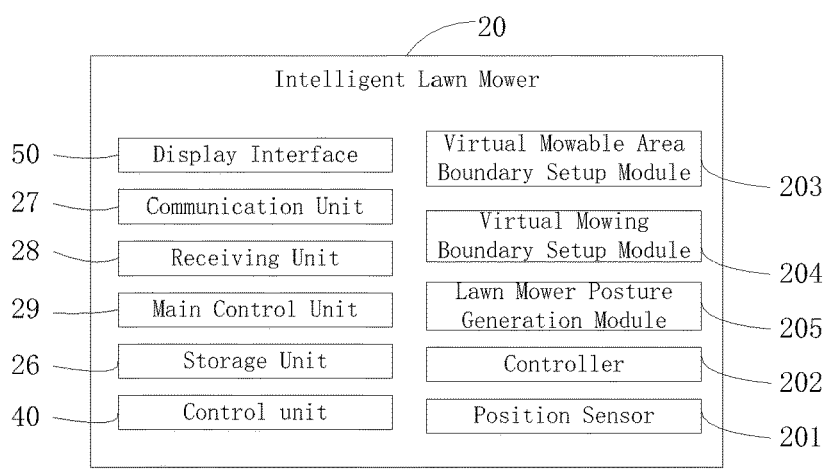
FIG. 4C is a schematic diagram of yet another structural framework of an intelligent mowing system according to an example of the present disclosure.

Referring to FIGS. 4A-4C, three example structural frameworks of an intelligent mowing system are briefly shown, according to an example of the present disclosure. The intelligent lawn mower 20, as shown in FIG. 4A, includes a receiving unit 28, a storage unit 26, a communication unit 27, and a main control unit 29. The receiving unit 28 of the intelligent lawn mower 20 receives the mobile station GNSS or GPS position signal from the mobile station 30, and the base station GNSS or GPS position signal from the base station 10.

The communication unit 27 communicates with a cloud server and/or a mobile terminal such as a mobile phone, and receives an offline electronic map or an online electronic map, such as a native Google online map and/or Gaude online map that comes with the mobile phone. The storage unit 26 communicates with the communication unit 27, and can reflect the position route formed by the received GNSS or GPS position signal of the intelligent lawn mower 20 on the offline map or the online map. Since the GNSS or GPS position signals of the intelligent lawn mower 20 are represented by the longitude position and the latitude position, and positions of online maps such as Google online map and/or Gaude online map and positions of offline maps are also represented by the longitude position and the latitude position, and the two coordinate systems are the same, the position route walked by the intelligent lawn mower 20 can be reflected on the online maps such as Google online map and/or Gaude online map and the offline maps as the actual walking path, by which the user can monitor the walking path of the intelligent lawn mower 20 and/or the area already mowed on the map by using a mobile terminal or the like.

In an example, the communication unit 27 is implemented as an TOT communication unit 27, which employs IOT communication technology, with the advantages of wide signal coverage, high-speed transmission and so on. It must be understood that other wireless data transmission technologies such as WWAN communication technology may also be adopted by the communication unit 27, and are within the scope of this disclosure.

Referring back to FIG. 1, in an example, the lawn mower 20 can record the coverage of the mowable area 54 and store it in the storage unit 26 by walking along the mowable area boundary 54.

Further, when setting the working area of the intelligent mower 20, the mowable area boundary 51 may be determined or selected on the map of the mobile terminal such as a mobile phone, and the mobile terminal will send the determined or selected mowable area boundary 51 to the intelligent lawn mower 20. The storage unit 26 of the intelligent lawn mower 20 stores the determined or selected mowable area boundary 51, and based on the determined or selected mowable area boundary 51, the control unit selects a suitable mowing mode and path to travel within the mowable area 54. As physical wires or the physical electronic fences are not required to be buried or arranged in the present disclosure, the intelligent lawn mower 20 works more worry-free, labor-saving and convenient.

The main control unit 29 derives the actual GNSS or GPS position of the intelligent lawn mower 20 from the mobile station GNSS or GPS position signal sent from the mobile station 30 and the base station GNSS or GPS position signal sent from the base station 10, processes data by algorithms and sends signals to control the walking direction and speed of the intelligent lawn mower 20, and sends control commands to the drive the motor 24 for execution.

In an example, the base station 10 can receive position signals coming from one or more satellites, for example, including GPS signals of US GPS, China Beidou, Russia GLONASS, EU GALILEO, etc. By receiving position signals from multiple satellites, the GNSS position signal deviation captured by the base station 10 can be reduced.

Similarly, the mobile station 30 on the intelligent lawn mower 20 is also capable of receiving position signals of one or more satellites, for example, including GPS signals of the US GPS, China Beidou, Russia GLONASS, EU GALILEO, etc. By receiving position signals from multiple satellites, the GNSS position signal deviation captured by the mobile station 30 can be reduced.

Figure 5:
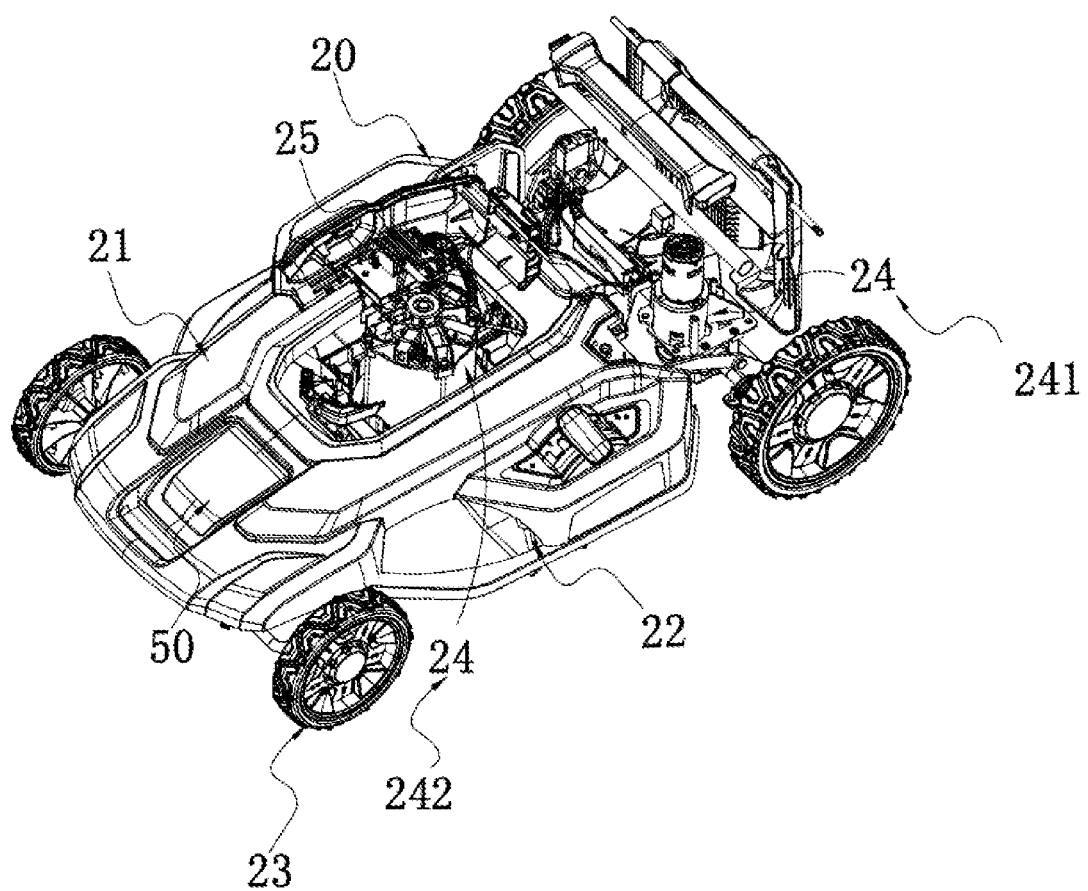
FIG. 5 is a perspective structural view of an example of an intelligent lawn mower according to the present disclosure.

The schematic structural view of an example of an intelligent lawn mower is shown in FIG. 5. The intelligent lawn mower 20 includes a cutting blade 22 for cutting grass or vegetation; a deck 21 for supporting the cutting blade 22; at least one wheel 23 rotatably supporting the deck; a drive motor 24 coupled to the at least one drive wheel 23, which provides a driving force to drive the at least one drive wheel 23. The motor outputs periodic electrical signals; a power supply device 25 providing electric power to the intelligent lawn mower 20; a power supply circuit electrically connected to the power supply device 25 and the motor 24 such that the electric power output from the power supply device 25 is supplied to the motor to propel the at least one drive wheel 23. It should be aware that the intelligent lawn mower 20 can work under the automatic operation mode, and also the manual operation mode, that is, the user manually controls the intelligent mowing machine 20 to perform the work.

Further, in an example, the drive motor 24 may include a first propel motor and a second cut motor, the first propel motor being configured to provide torque to the at least one drive wheel 23 to propel the intelligent lawn mower 20 to walk, the second cutting motor being configured to provide torque to the cutting blade 22 to drive the cutting blade 22 to rotate.

Alternatively, the drive motor 24 may be provided just a single motor, which drives both the wheel 23 and the cutting blade 22. In the present disclosure, the structural components of the intelligent lawn mower 20 may vary as long as the mowing tasks of the intelligent lawn mower 20 can be completed.

Specifically, in an example, the intelligent mowing system further includes a control unit 40, which is mounted to one or more mobile terminals 60, and the mobile terminals 60 serve as the master computer of the intelligent mowing system. The mobile terminals 60 can be implemented as an intelligent mobile device such as a computer, a mobile phone, a wristwatch, a VR/AR glasses, or the like. The intelligent lawn mower 20 achieves signal transmissions with the mobile terminals 60 through the communication unit 27, and the control unit 40 runs on the mobile terminals 60, which calculates and analyzes the working area of the intelligent lawn mower 20, and controls the working area of the intelligent lawn mower 20 by the communication unit 27. It is contemplated that the control unit 40 mounted on the mobile terminals 60 can also connect and control the operation state of multiple intelligent lawn mowers 20.

Figure 6:
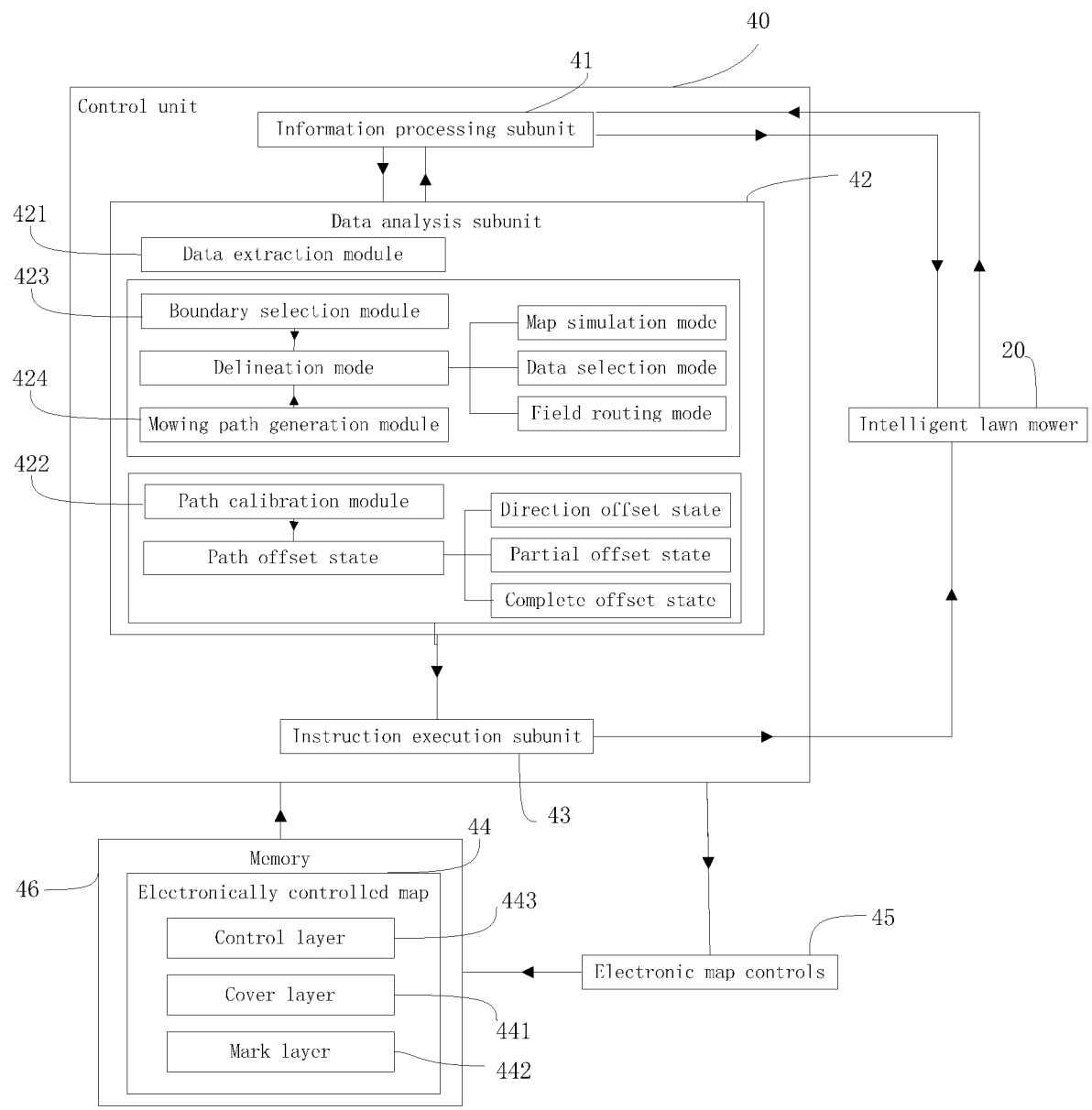
FIG. 6 is a schematic diagram of a control unit of an intelligent mowing system according to an example of the present disclosure.

FIG. 6 depicts a schematic diagram of a control unit framework according to an example of the present disclosure. Referring to FIG. 6, the control unit 40 controls the generation of the display interface 50 displayed by the display device of the mobile terminal 60. The control unit 40 may be alternatively installed inside the intelligent lawn mower 20, in this case, the control unit 40 controls to generate a display interface displayed on the intelligent lawn mower 20.

The control unit 40 includes a control panel generated by the control unit 40 and displayed on the display interface 50. The control panel displays an electronic map and relevant control buttons of the control unit 40, including but not limited to the start/stop button, the work mode switch button, the communication on/off button, and so on. The control unit 40 receives input instructions from the control buttons on the control panel to change the working state of the intelligent lawn mower 20.

When acquiring the position data of the intelligent lawn mower 20, the mobile antenna receives the mobile station GNSS or GPS location signal from the mobile station 30 and the base station GNSS or GPS location signal from the base station 10. The main control unit 29 analyzes the mobile station GNSS or GPS position signals and base station GNSS or GPS position signals received in real-time and converts the position information into corresponding real-time latitude and longitude position coordinates.

Figure 7:
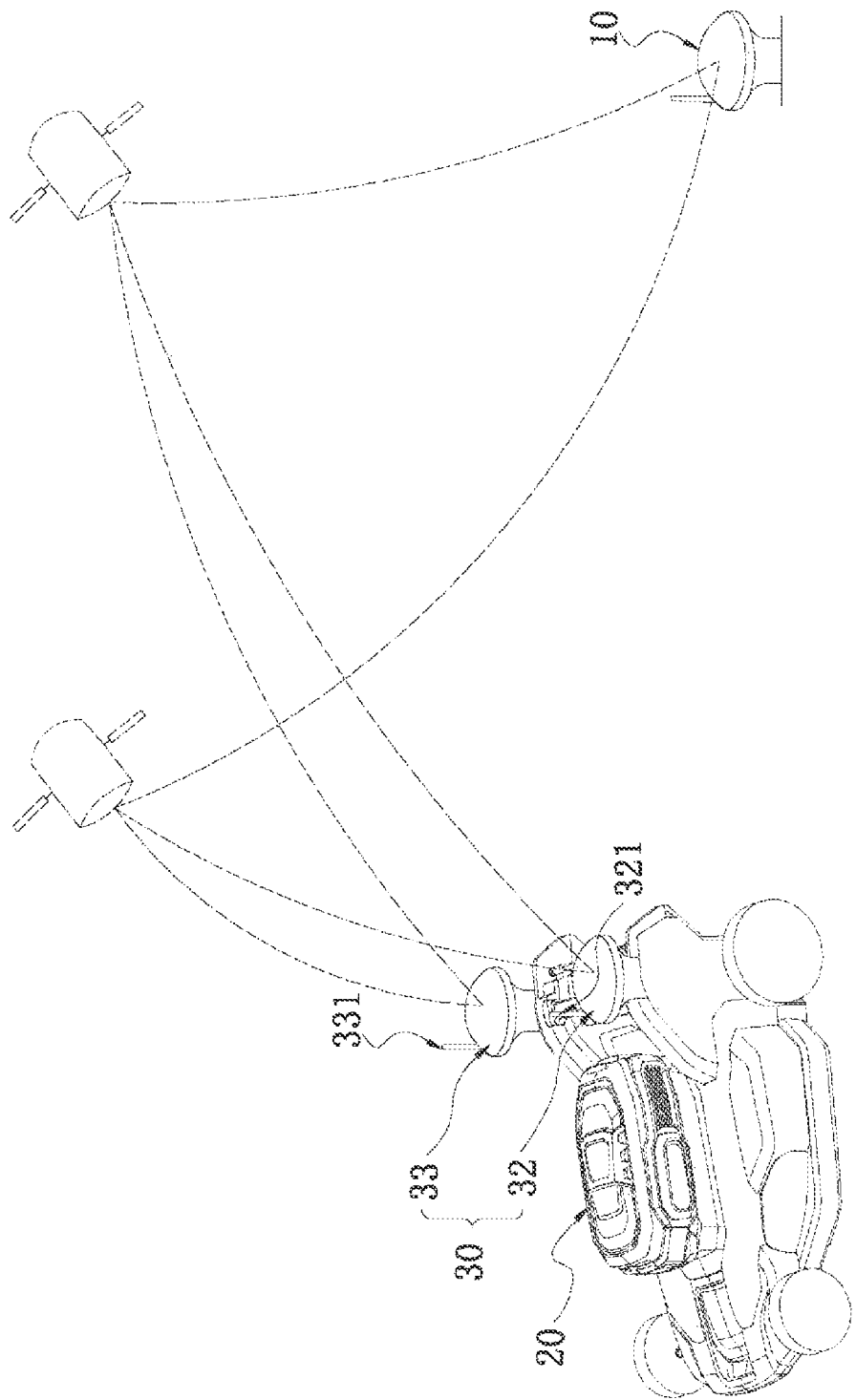
FIG. 7 is a schematic diagram of dual mobile stations of an intelligent mowing system according to an example of the present disclosure.

A dual mobile station structure of the intelligent lawn mower system is illustrated with reference to FIG. 7, according to an example of present disclosure. As shown in FIG. 7, two mobile stations 30 are configured, that is, a mobile station group is provided on the intelligent lawn mower 20, and the mobile station group is mounted on the intelligent lawn mower 20, wherein the first mobile station 32 is spaced from the second mobile station 33. The actual GNSS position signal of the intelligent lawn mower 20 is computed as the calibration of the mobile station GNSS position signal received by the mobile station group and the base station GNSS position signal received by the base station. The mobile station 30 may also be configured in multiples. In order to reduce costs, two mobile stations may be equipped, so that the position data of the intelligent lawn mower 20 can be accurately obtained. The position data of the intelligent lawn mower 20 refers to position coordinate information and direction information of the intelligent lawn mower 20.

The mobile station group includes a first mobile station 32 and a second mobile station 33, the first mobile station 32 is equipped with a first antenna 321, and the second mobile station 33 is equipped with a second antenna 331. For example, the first mobile station 32 and the second mobile station 33 may be installed in the width direction of the intelligent lawn mower 20. In this way, the operation or mowing direction of the intelligent lawn mower 20 can be determined by the central axis between the first antenna 321 and the second antenna 331, and the relative position of the first antenna 321 and the second antenna 331 can be used to perform positioning or to determine the virtual outer frame of the intelligent lawn mower 20.

With the positioning of the first mobile station 32 and the second mobile station 33, the current position, direction, speed and trajectory of the intelligent lawn mower 20 can be accurately calculated, the working state of the intelligent lawn mower can be accurately acquired, and the working position of the intelligent lawn mower 20 can be adjusted, so that the working efficiency and accuracy of the intelligent lawn mower 20 are greatly improved, the aesthetics of the working area of the intelligent lawn mower 20 is improved, electric energy is saved and the service life of the intelligent lawn mower 20 is increased.

Specifically, when the first antenna 321 or the left antenna is mounted on the side of the intelligent lawn mower 20 in the width direction, it is 10 cm away from the left side of the intelligent lawn mower 20 in the longitudinal direction; when the second antenna 331 or the right antenna is mounted on the side of the intelligent lawn mower 20 in the width direction, it is 10 cm away from the right side of the intelligent lawn mower 20 in the longitudinal direction. Since the width and length of the intelligent lawn mower 20 are known, the relative positions of the first antenna 321 and the second antenna 331 mounted on the intelligent lawn mower 20 can be used to simulate the virtual outer frame of the intelligent lawn mower 20, and to position the intelligent lawn mower 20 accurately.

When the intelligent lawn mower 20 is operating within the mowable area boundary 51 or the virtual mowable area boundary 515A, the first antenna 321 and the second antenna 331 provided on the intelligent lawn mower 20 can be used to calculate the position and orientation of the intelligent lawn mower 20, and the deviation of the intelligent lawn mower 20 from mowable area 54 or virtual mowable area boundary 515A, or the distance from the target position 55. According to the distances from these boundary lines and the target position 55, appropriate motion control, integrated navigation and position control are implemented.

In an example of the present disclosure, the first antenna 321 and the second antenna 331 are mounted on a side of the intelligent mower 20 in the width direction. In other examples, the first antenna 321 and the second antenna 331 may be mounted at any two locations on the intelligent lawn mower 20, and with the first antenna 321 and the second antenna 331 mounted at arbitrary two locations on the intelligent lawn mower 20, it is still possible to determine direction of the intelligent lawn mower 20, and to position the intelligent lawn mower 20, and to determine the virtual outer frame boundary of the intelligent lawn mower 20. The manner in which the first antenna 321 and the second antenna 331 are mounted can be arbitrary, and is not limited in the disclosure.

The main control unit 29 of the intelligent lawn mower 20 calibrate the mobile station group GNSS or GPS position signal transmitted by the first mobile station 32 and the second mobile station 33 with the base station GNSS or the GPS position signal to obtain the positions of the first antenna 321 and the second antenna 331 on the intelligent lawn mower 20. Further, the position information of the intelligent lawn mower can be obtained from positions information of the first antenna 321 and the second antenna 331.

The intelligent lawn mower 20 further includes at least one position sensor 201, to detect the real time heading direction of the intelligent lawn mower 20. In an example, the position sensor 201 may be a Gyro sensor. The Gyro sensor may be mounted on the intelligent lawn mower 20 to detect the real time movement direction such as rotation angle of the intelligent lawn mower 20.

It can be understood that the position sensor 201 may be any number of the other suitable position sensing devices, including gyroscopes, accelerometers, inertial measurement units, barometers, magnetometers, and communication devices so that the inaccurate positioning of the intelligent lawn mower 20 under bad mobile station signal is bad can be avoided.

When tracking the position of the intelligent lawn mower 20, the intelligent mowing system may be provided with two position tracking modes, including a stable tracking mode and an auxiliary tracking mode. The main control unit 29 of the intelligent lawn mower 20 may be provided with an algorithm incorporating the above two position tracking modes, namely the stable tracking mode and the auxiliary tracking mode.

The stable tracking mode is the default position tracking mode of the intelligent lawn mower 20, and when the mobile station group receives a good GNSS or GPS signal, the main control unit 29 sets the position tracking mode to be stable tracking mode. Under stable tracking mode, the receiving unit 28 receives the GNSS or GPS position signal from the mobile station group, and the GNSS or GPS position signal from the base station, and thereby determines the real-time position data and direction data of the intelligent lawn mower 20 and obtains position information of the intelligent lawn mower 20. The main control unit 29 converts these data into corresponding latitude and longitude coordinate data and orientation angle data, and transmits the latitude and longitude coordinate data and orientation angle data to the control unit 40.

Further, when the mobile station group receives an unstable GNSS or GPS signal, or loses a GNSS signal or a GPS signal, the main control unit 29 sets the position tracking mode to the auxiliary tracking mode. The main control unit 29 predicts the position information of the intelligent lawn mower 20 based on the real-time movement direction of the intelligent lawn mower 20 detected by the position sensor 201 and the current speed of the intelligent lawn mower 20. The main control unit 29 further controls the intelligent lawn mower 20 to operate along the predicted preset path 52. After the GNSS or GPS signal acquired by the mobile station group becomes stable, the main control unit 29 switches the position tracking mode to the stable tracking mode and controls the intelligent lawn mower 20 to operate along the preset path 52.

Further, in the auxiliary tracking mode, when the main control unit 29 detects a substantial digression, off-track of the running intelligent lawn mower 20, the intelligent lawn mower 20 is stopped. After the GNSS or GPS signal received by the mobile station group becomes well stabilized, the main control unit 29 switches the position tracking mode to the stable tracking mode and controls the intelligent lawn mower 20 to operate along the preset path 52.

It can be understood that the main control unit 29 may be set at the control unit 40. The control unit 40 receives the mobile station GNSS or GPS position signal and the base station GNSS or GPS position signal, algorithmically processes the signals to obtain the latitude and longitude coordinate data to generate the real-time position information of the intelligent lawn mower 20. The control unit 40 selects and switches the position tracking mode to the stable tracking mode or the auxiliary tracking mode, and sends the latitude and longitude coordinate data to the information processing subunit 41. The main control unit 29 may be optionally set on the control unit 40 and the intelligent lawn mower 20 at the same time, and the present disclosure is not limited thereto.

The intelligent lawn mower 20 has an effective operating range, and the effective operating range has an operating width. The effective operating range is the mowing range of the intelligent lawn mower 20 operating in fixed spot. The operating width corresponds to the effective cutting width of the cutting blade 22 of the intelligent lawn mower 20.

The main control unit 29 may set a reference point, or calibration point, for the positioning and preset path 52 planning for the intelligent lawn mower 20. In one example, the central point of the effective operating range may be set as the reference point. The reference point may alternatively be the central point of the virtual outer frame or any point of the intelligent lawn mower 20. The main control unit 29 can analyze the space state of the intelligent lawn mower 20 using the corresponding real time position information of the reference point.

Figure 8:
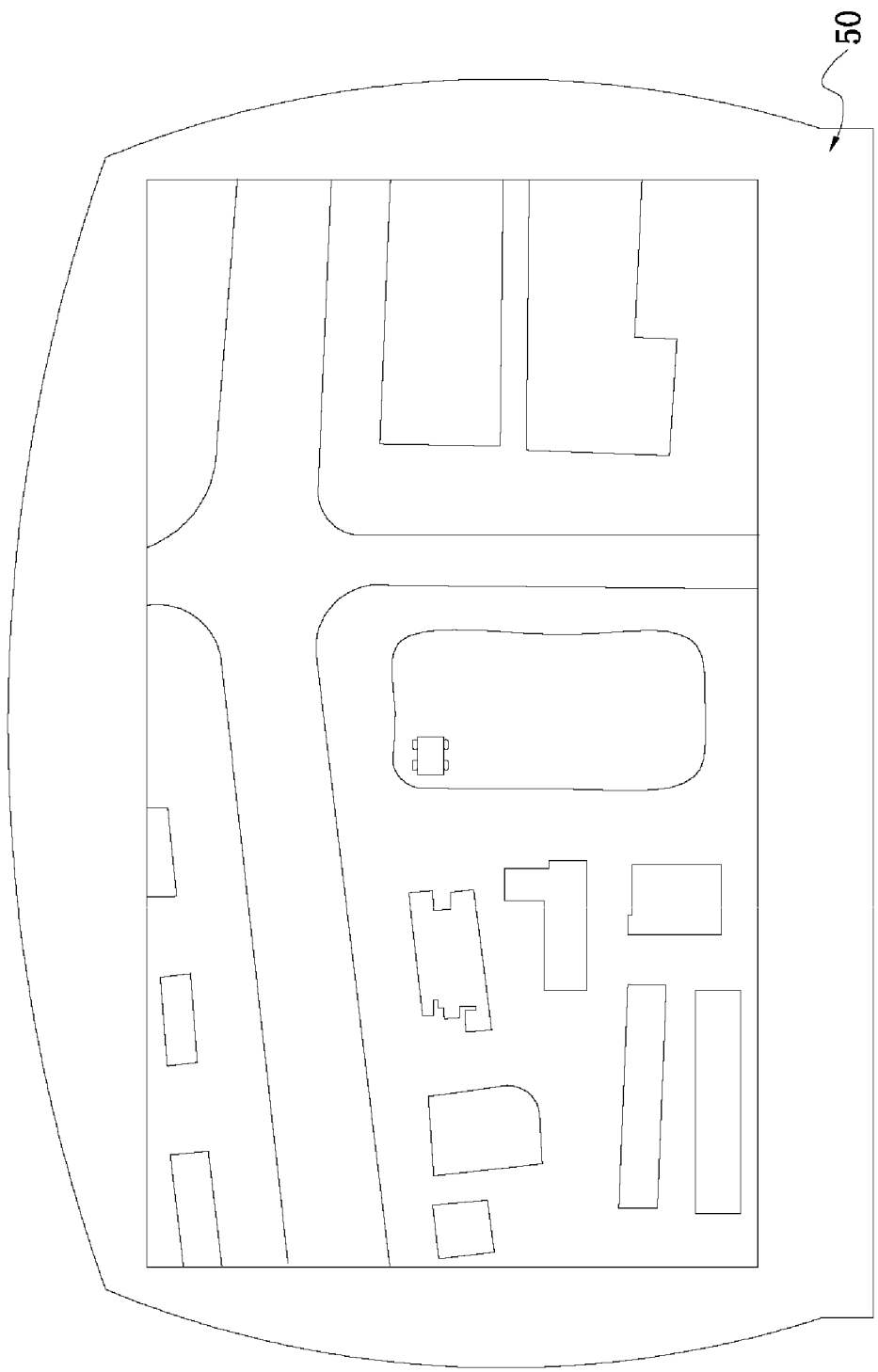
FIG. 8 is a plan view of an electronically controlled map of an intelligent mowing system according to an example of the present disclosure.

Referring to FIG. 8, a schematic plan view of an electronically controlled map of an example of the present disclosure is illustrated. In order to enhance the positioning function of the intelligent mowing system, the control unit 40 loads an electronic map and generates an electronically controlled map 44, and stores the content of the electronically controlled map 44 in the memory 46 of the mobile terminal such that the electronically controlled map 44 operates with the memory 46. Alternatively, the control unit 40 is set on the intelligent lawn mower 20, and the content of the electronically controlled map 44 is stored in the storage unit 26 of the intelligent lawn mower 20, and the electronically controlled map 44 operates with the storage unit 26.

The control unit 40 maps the working area of the intelligent lawn mower 20 to the electronically controlled map 44, so that by operating the electronically controlled map 44, the operating area and the preset path 52 of the intelligent lawn mower 20 can be determined. In this way the control unit 40 controls the operating area and the preset path 52 of the intelligent lawn mower 20.

The control unit 40 also maps the actual position of the intelligent lawn mower 20 to the electronically controlled map 44, and displays the actual position of the intelligent lawn mower 20 on the electronically controlled map 44. It can be understood that the electronically controlled map 44 is displayed on the display interface 50, and instructions can be input to the electronically controlled map 44 through an input device of the mobile terminal.

Specifically, the control unit 40 includes an electronic map control 45, which may include world or regional electronic map data, or may load one or a combination of online and offline electronic map data. The electronic map control 45 is configured to be able to extract regional electronic map data, and those skilled in the art can understand that any arbitrary position displayed in the electronic map corresponds to the international standard latitude and longitude data. The electronic map control 45 or the cloud storage stores the latitude and longitude data of arbitrary position points in the display area map, that is, the latitude and longitude data of the actual position corresponding to a position point displayed by the electronically controlled map 44 can be acquired by the electronic map control 45.

In an example, the electronic map control 45 is implemented as G-Map control. G-Map control is an existing electronic map loading and processing tool. G-Map control can initialize and load the displaying content and operating data of the electronically controlled map 44. G-Map can also be used to set display information such as central point, zoom level, resolution, view type, and the like. Other implementation methods for electronic map control are also applicable; the example here is for illustration purpose only and does not limit the scope of disclosure.

Further, the control unit 40 includes an information processing subunit 41, a data analysis subunit 42 and an instruction execution subunit 43. The information processing subunit 41 is configured to receive and process data information required for the operation of the control unit 40. The information processing subunit 41 receives user's operation instruction on the intelligent mowing system. It can be understood that the information processing subunit 41 can also receive the RTK-GNSS signal and/or GPS signal sent by the mobile station 30 and send a control instruction to the instruction execution subunit 43 to control the operating area and the preset path 52 of the intelligent lawn mower 20.

Those skilled in the art can understand that the information processing subunit 41 is implemented as one or a combination of data transmission technologies such as IOT communication, WWAN communication, and serial port data transmission in order to meet the characteristic requirements of data transmission in different situations, thereby to ensure the stability and timeliness of data transmission of the information processing subunit 41.

The information processing subunit 41 is in communication connection with a cloud server and/or with a mobile terminal such as a mobile phone, and receives offline maps or online maps. The information processing subunit 41 can also receive information such as update data and operating data of the intelligent mowing system from a cloud server.

The data analysis subunit 42 receives data processed by the information processing subunit 41, and performs data analysis and computation required for electronic map data extraction, path planning analysis, operation calibration analysis, and generates corresponding control instructions. The instruction execution subunit 43 makes a corresponding instruction response action according to the result generated by the data analysis subunit 42 from data processing.

Users can input control commands for the intelligent mower 20 through the control panel, for example, operation time, start and stop, traveling speed, work intensity. The information processing subunit 41 acquires the user command and sends user command to the instruction execution subunit 43. The instruction execution subunit 43 sends a control signal to the main control unit 29 of the intelligent lawn mower 20 to control the intelligent lawn mower 20 to execute a corresponding user instruction.

The data analysis subunit 42 includes a data extraction module 421, and the data extraction module 421 extracts location data and instruction data generated during the operation of the electronically controlled map 44, and transmits the integrated data to the instruction execution subunit 43 in real time.

Those skilled in the art will understand that the units and modules referred to in this disclosure may be implemented as software such as data structures, components, libraries, routine programs, and one or a collection of hardware, such as memory 46, and operational algorithms to perform tasks, convert data types and component states, thereby achieving the technical effects.

Figure 9:
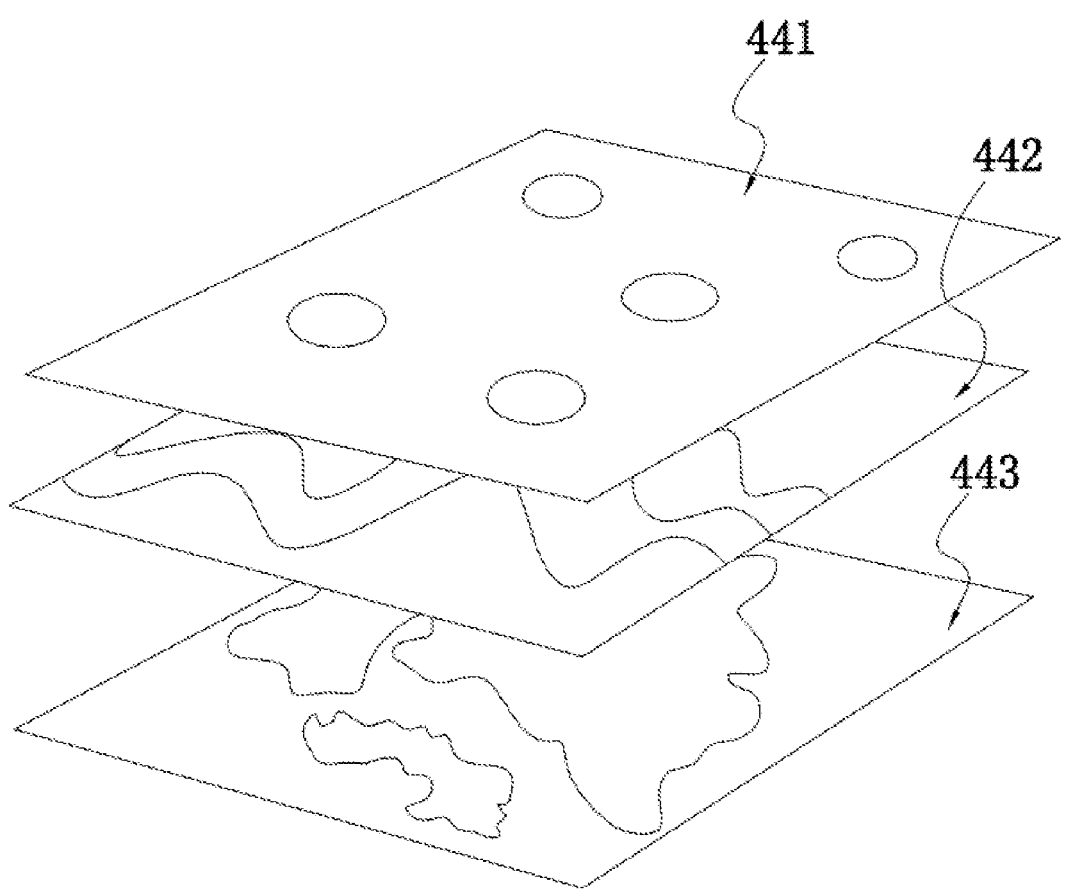
FIG. 9 is an exploded view of an electronically controlled map of an intelligent mowing system according to an example of the present disclosure.

Referring to FIG. 9, an exploded view of an electronically controlled map of an example of the present disclosure is shown. The data analysis subunit 42, in conjunction with the electronic map control 45, generates the electronically controlled map 44. The electronically controlled map 44 includes a cover layer 441, a mark layer 442 and a control layer 443. The cover layer 441, the mark layer 442 and the control layer 443 are jointly generated and superimposed. The electronic map control 45 loads and processes an electronic map to generate and display a corresponding map image of the cover layer 441. The mark layer 442 includes a plurality of the position points, each of the position points matching a corresponding point of the cover layer 441, and stores the latitude and longitude data of the location points.

The control layer 443 senses an operation instruction of the user to the electronically controlled map 44. The control layer 443 is connected to the input device of the mobile terminal, and the user activates the control layer 443 through the input device. The input device may be a mouse, a touch screen, or the like, and the position point or the operating area is selected by clicking or drawing in the control layer 443, thereby selecting a position point or an operating area on the mark layer 442 overlapping the control layer 443. The control layer 443 senses an operation action of the user on the electronically controlled map 44, and extracts data of a corresponding position point in the control layer 443 selected by the operation action.

The data extraction module 421 extracts and integrates the latitude and longitude data corresponding to the target location 55 selected by the user in the mark layer 442, and sends the data to the instruction execution subunit 43. The instruction execution subunit 43 controls the cover layer 441 to display the selected state of the corresponding position point or operating area.

When the user uses the intelligent mowing system, the user confirms the basic information of the work address and selects the work address on the electronically controlled map 44 through the control unit 40, and determines the basic display settings of the electronically controlled map 44, such as center point and the zoom level, resolution, and view type. The electronic map control 45 determines the generated map area range of the electronically controlled map 44 according to the basic address information input by the user, and performs map slicing to generate the electronically controlled map 44.

Further, the data analysis subunit 42 includes a boundary selection module 423 and a mowing path generation module 424. The boundary selection module 423 is used to select a mowable area boundary 51 of the intelligent mowing machine 20 and display the mowable area boundary 51 on the electronically controlled map 44. The mowing path generation module 424 is used to calculate and simulate a mowing path 53 of the intelligent lawn mower 20, and display the mowing path 53 on the electronically controlled map 44.

The intelligent lawn mower 20 further includes a controller 202 electrically connected or in communication with the mobile terminal and the mowing path generation module 424. The controller is configured to control the intelligent lawn mower 20 to perform mowing task following the mowing path 53 generated by the mowing path generation module 424.

It can be understood that the control unit 40 may be installed in the controller 202 to be directly installed in the intelligent lawn mower 20, and the control unit 40 is operated in the controller 202.

It can be understood that the position points on the electronically controlled map 44 correspond to the real world position points one by one, and have the latitude and longitude coordinate data such that by extracting the latitude and longitude coordinate data information of the selected position points, the mowable area boundary 51 and the preset path 52 that are planned on the electronically controlled map 44 can be projected into the real world area, in this way, the mowable area boundary 51 and the preset path 52 required by the user are selected in reality.

Specifically, when preparing to use the intelligent mowing system, the user operates the control unit 40 by the mobile terminal or the display interface of the intelligent lawn mower 20, and selects the basic information of the job address to generate the electronically controlled map 44. The user uses the control unit 40 to delineate the mowable area boundary 51 or the preset path 52. In an example, the data analysis subunit 42 is built-in with three delineation modes, respectively field routing mode, map simulation mode, and data selection mode.

Figure 10:
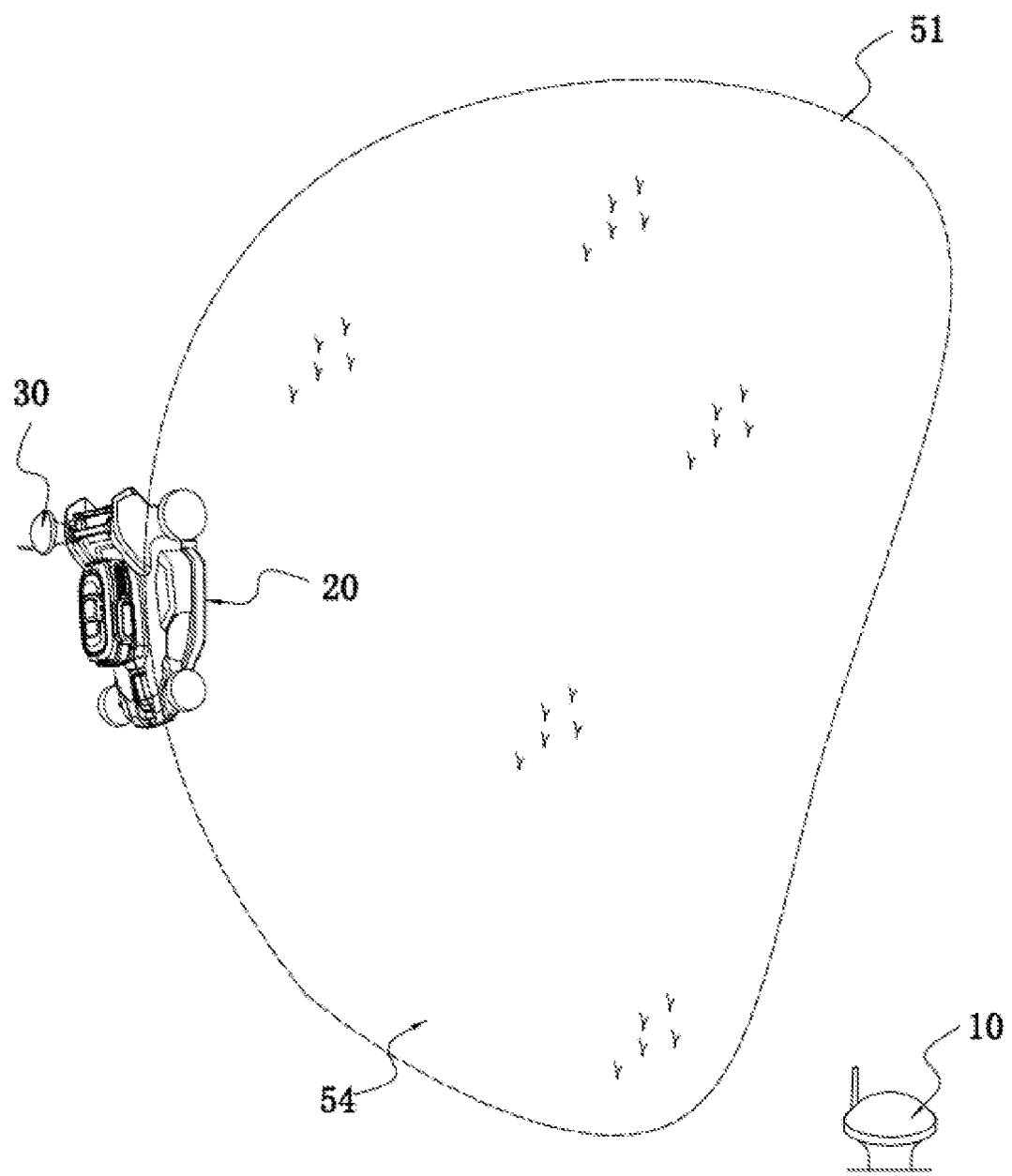
FIG. 10 is a schematic diagram of determining a mowable area boundary by an intelligent mowing system according to an example of the present disclosure.

Referring to FIG. 10, a schematic diagram for determining the mowable area boundary according to an example of the intelligent mowing system, the field routing mode refers to a user leading the intelligent lawn mower 20 around along a mowable area boundary 51 or a mowing path 53. The data extraction module 421 records the latitude and longitude data of each point of the walking trajectory of the intelligent lawn mower 20, records the walking trajectory data and converts the data to display on the electronically controlled map 44. The electronically controlled map 44 displays the corresponding field routing path, and converts it into the corresponding mowable area boundary 51 and the area of the work area or the preset path 52.

The map simulation mode refers to directly selecting a mowable area boundary 51 or a preset path 52 on the electronically controlled map 44 by drawing lines or locating points. The data extraction module 421 extracts position data and the electronically controlled map 44 displays the equivalent field routing path, and converts it into the corresponding mowable area boundary 51 and the area of the work area or the preset path 52 to control the operation of the intelligent lawn mower 20.

The data selection mode refers to directly inputting the coordinate information of a mowable area boundary 51 or a preset path 52, and the electronically controlled map 44 displays the corresponding field routing path, and converts it into the corresponding mowable area boundary 51 and the area of the work area and the preset path 52 to control the operation of the intelligent lawn mower 20.

It should be understood that the three delineation modes do not pose a limitation on the present disclosure, and any one or a combination thereof may be selected as the boundary delineation scheme of this example. In an example, the combination of a field routing mode, a map simulation mode, and data selection mode may be used as the boundary delineation scheme of the present disclosure to meet the needs of varying situations and preferences of users.

The information processing subunit 41 analyzes user input, and determines whether the delineation object is the mowable area boundary 51 or the preset path 52. If the user selects to upload the mowable area boundary 51, the boundary selection module 423 is activated, which acquires the delineation data and defines it as the mowable area boundary 51. The boundary selection module 423 also calculates the area of the corresponding work area.

In practice, when the user prepares to use the intelligent lawn mower 20 to select the mowable area boundary 51, the user sends a delineation instruction to the information processing subunit 41, and selects the delineation mode and object. When the user selects to delineate the mowable area boundary 51 with the field routing mode, the user walks around the mowable area boundary 51 together with the intelligent lawn mower 20. The boundary selection module 423 receives the real time position information during the movement process of the intelligent lawn mower 20, records the movement trajectory of the intelligent lawn mower 20 and generates corresponding trajectory coordinate information and transmits the trajectory coordinate information to the instruction execution subunit 43, so as to obtain the boundary and area of the user-desired mowable area 54, and control the intelligent lawn mower 20 to operate within the acquired mowable area boundary 51 subsequently.

When the user selects to delineate the mowable area boundary 51 with the map simulation mode, the user uses the output device of the mobile terminal, such as a mouse or a touch screen, to draw an area of selection on the electronically controlled map 44 to select a closed area. The data extraction module 421 extracts the latitude and longitude coordinate data of the selected closed area, integrates and transmits the data to the instruction execution subunit 43, so as to obtain the boundary and area of the user-desired mowable area 54, and control the intelligent lawn mower 20 to operate within the acquired mowable area boundary 51 subsequently.

When the user selects to delineate the mowable area boundary 51 with the data selection mode, the control unit 40 gets direct input data of the latitude and longitude coordinate of the boundary inflection point, and the boundary selection module 423 converts it to the corresponding mowable area boundary 51, and controls the intelligent lawn mower 20 to operate within the acquired mowable area boundary 51 subsequently.

It is worth mentioning that the user may select two or more of the delineation modes above at the same time in order to calibrate the result of boundary delineation. If it is found that the positioning of the trajectory of the intelligent lawn mower 20 is not accurate under field routing mode, resulting in deviations in the acquired mowable area boundary 51, the user can manually correct the mowable area boundary 51 under the map simulation mode in order to effectively improve the accurateness of the acquisition of the mowable area boundary 51.

It is worth mentioning that the position sensor 201 or the mobile station 30 of the intelligent lawn mower 20 may be detachably mounted on the intelligent lawn mower 20. If the user selects the field routing mode, the position sensor 201 or the mobile station 30 may be detached and hand-held to move together with the user to ease the practical operation of field routing delineation.

After selecting the mowable area boundary 51 of the intelligent lawn mower 20, the intelligent mowing system determines an operating area, and the mowing path generation module 424 determines a preset path 52 based on the shape of the operating area. The mowing path generation module 424 has a path analysis algorithm, which can optimize path planning according to the shape of the current operating area and the operating parameters of the intelligent lawn mower 20, and perform path curve fitting to complete the optimal path analysis simulation, and calculate a preset path 52 so as to improve the operation efficiency of the intelligent lawn mower 20 and to achieve the purpose of energy saving.

The mowing path generation module 424 analyzes the corresponding mowing path 53 from the preset path 52. The mowing path 53 corresponds to the execution order of the actual operating path of the intelligent lawn mower 20. It can be understood that the intelligent mowing path generation module 424 may directly generate a preset path 52 with an execution order, and directly control the operation of the intelligent lawn mower 20 by the control unit 40 following the preset path 52, whereby there is no need to generate the mowing path 53.

Figure 11:
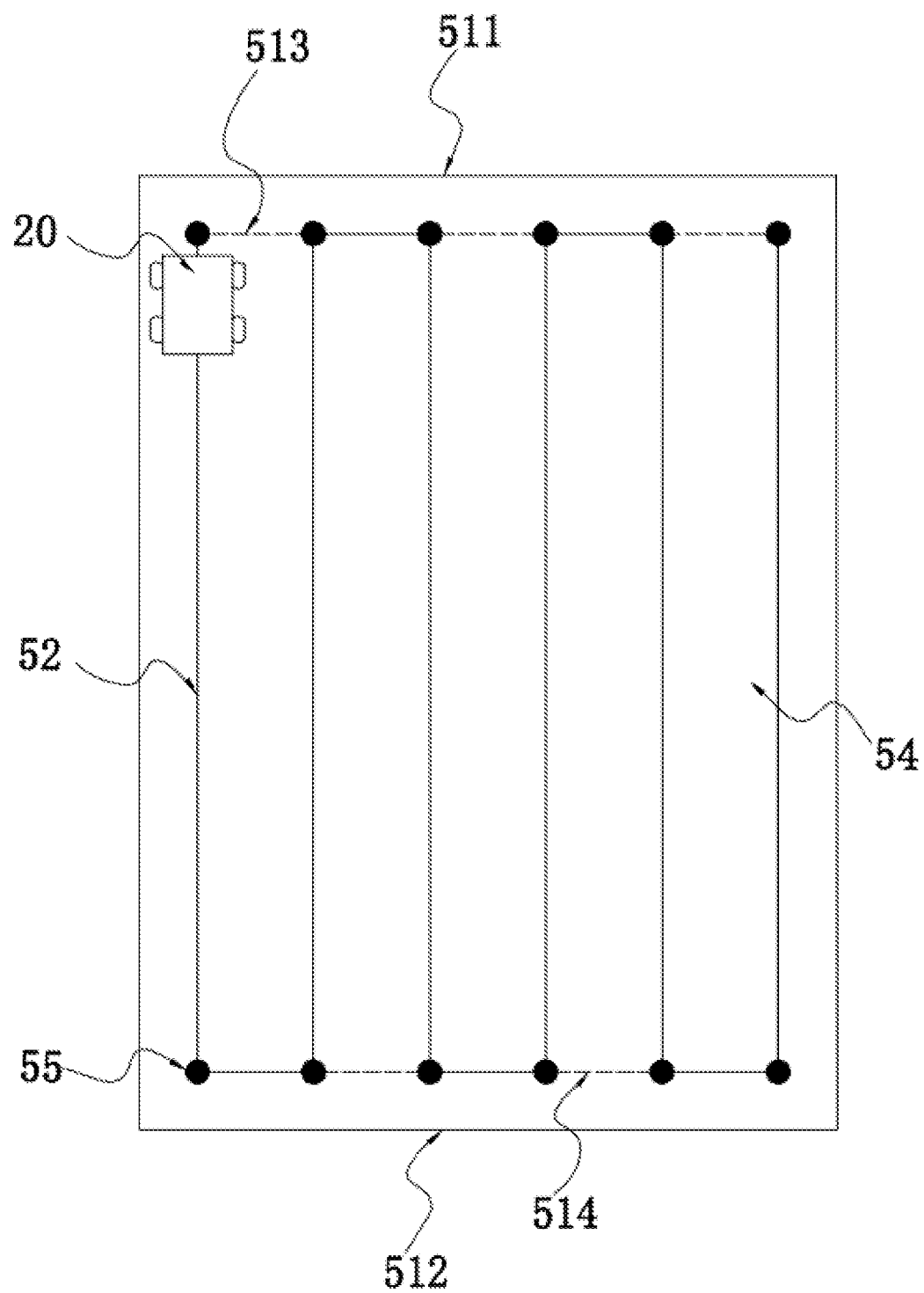
FIG. 11 is a schematic diagram of the path planning in a mowable area of an intelligent mowing system according to an example of the present disclosure.
Figure 12:
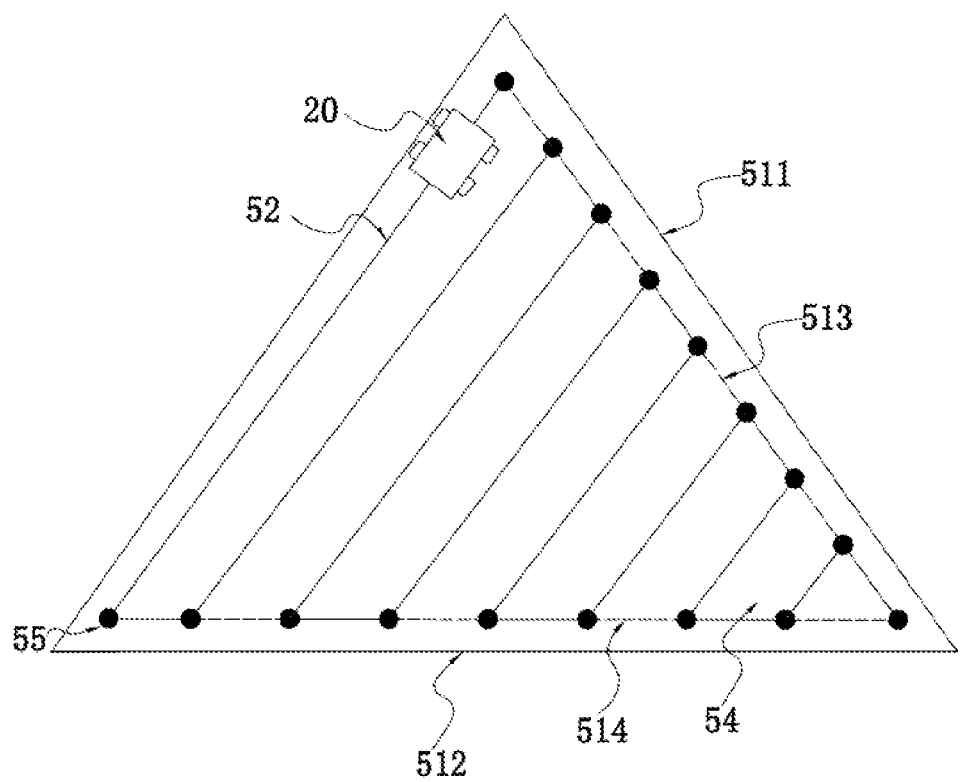
FIG. 12 is a schematic diagram of the path planning in another mowable area of an intelligent mowing system according to an example of the present disclosure.
Figure 13:
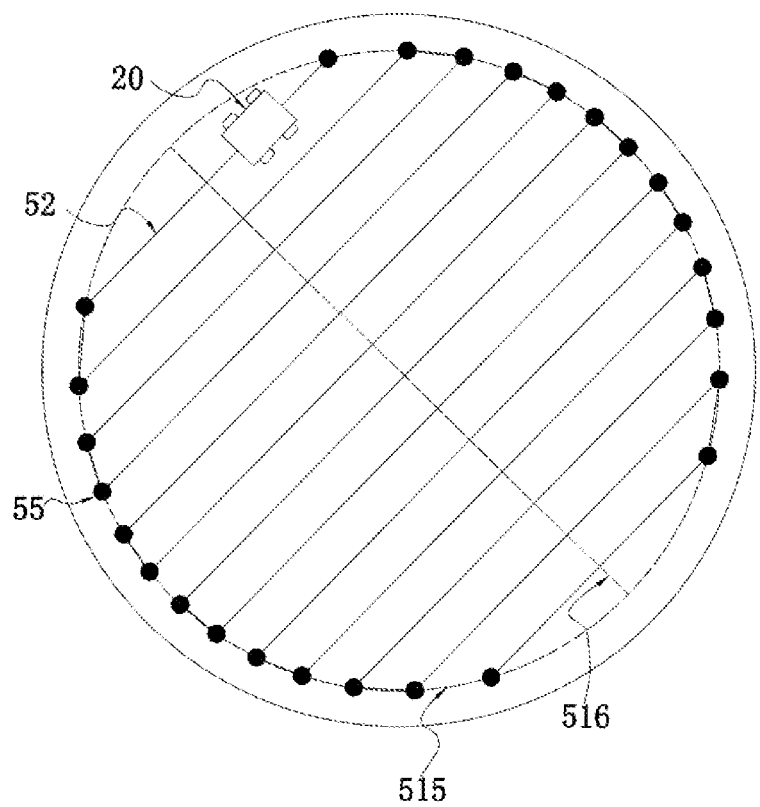
FIG. 13 is a schematic diagram of the path planning in yet another mowable area of an intelligent mowing system according to an example of the present disclosure.

Referring to FIGS. 11-13, three examples of path planning schematic for variable mowable areas of the intelligent mowing system are briefly shown, according to an example of the present disclosure.

In an example, the preferred path pattern, or path planning mode of mowing path generation module 424 includes a straight-line round-trip mode and a spiral indentation mode. In order to introduce the above path modes, the effective cutting width of the intelligent lawn mower 20 is defined as the operating width, and it is assumed that the operating area has a first boundary 511 and a second boundary 512, and the first boundary 511 and the second boundary 512 are relatively set.

As shown in FIG. 11, in the straight-line round-trip mode, the planned preset path 52 extends from the first boundary 511 to the second boundary 512 and generates a first path line, and follows the boundary of the second boundary 512 to extend a distance of an operating width in an unplanned direction, and then extend back to the first boundary 511 in parallel with the first path to form a second path line, and so on until the preset path 52 fills the working area. At this time part of the preset path 52 shows a "creeping line" shape, and the preferred path lines are perpendicular to the first boundary 511 and the second boundary 512.

In the spiral indentation mode, the planned preset path 52 is a circle along the mowable area boundary 51, and it is repeatedly indented inward by a distance of half of the operating width. The spiral indentation is repeated until the center of the work area. At this time part of the preset path 52 presents a "spiral" shape. The spiral indentation mode is especially suitable for cases where there are obstacles, for example, trees, in the work area. In this case, the obstacles may be planned in the work area center, and the work may end when the intelligent lawn mower 20 operates near the obstacle.

It can be understood that one work area may be divided into multiple work subareas, and different path planning modes may be selected for each work subarea. For example, a work area is divided into multiple work subareas, and some work subareas adopt a spiral indentation mode, some work subareas adopt a straight-line round-trip mode, which cooperate to complete the path planning for the work area. Therefore, the mowing path generation module 424 can analyze the optimal operating plan according to specific conditions.

It is worth mentioning that, in addition to automatically planning the preset path 52 by the mowing path generation module 424, the preset path 52 may also be manually set by the path delineation function of the intelligent mowing system. In actual operations, the user can select the delineation function and select the object to be the preset path 52. The mowing path generation module 424 is then activated to obtain the path data from the path delineation and set it as the preset path 52. The path delimitation module calculates the corresponding preset path 52 sequence and operating data such as the operating area.

In practice, when the user manually selects the preset path 52, the user sends a delineation instruction to the information processing subunit 41, and selects the delineation mode and object. When the user selects to delineate the preset path 52 with the field routing mode, the user walks around the preset path 52 together with the intelligent lawn mower 20. The mowing path generation module 424 receives the real time position information during the movement process of the intelligent lawn mower 20, records the movement trajectory of the intelligent lawn mower 20 and generates corresponding trajectory coordinate information and transmits the trajectory coordinate information to the instruction execution subunit 43, so as to obtain the boundary of the user-desired mowable area 54 and the preset path 52, and control the intelligent lawn mower 20 to operate along the acquired preset path 52 subsequently.

When the user selects to delineate the preset path 52 with the map simulation mode, the user uses the output device of the mobile terminal, such as a mouse or a touch screen, to draw an area of selection on the electronically controlled map 44 to select a closed area. The data extraction module 421 extracts the latitude and longitude coordinate data of the selected closed area, integrates and transmits the data to the instruction execution subunit 43, so as to obtain the preset path 52, and control the intelligent lawn mower 20 to operate along the acquired preset path subsequently.

When the user selects to delineate the preset path 52 with the data selection mode, the control unit 40 gets direct input data of the latitude and longitude coordinate of the path inflection point, and the mowing path generation module 424 converts it to the corresponding preset path 52, and controls the intelligent lawn mower 20 to operate along the acquired preset path subsequently.

After planning the preset path 52, the mowing path generation module 424 sets a plurality of target positions 55 on the preset path 52, a target position 55 is an identifier, and the intelligent lawn mower 20 determines the operating direction based on the target positions 55. The mowing path generation module 424 algorithmically assigns serial number attributes, such as the target position No. 1 and the target position No. 2 etc. The mowing path generation module 424 analyzes the actual trajectory of the intelligent lawnmower 20 according to the preset path 52, places the target positions 55 on the preset path 52 in order, and sequentially increments the sequence number of the target positions 55 until the end for the intelligent lawnmower 20.

The relative distance between the target positions 55 may be equal, or may be planned differently according to a specific preset path 52. The intelligent lawn mower 20 moves straightly and in order between every two target positions 55 with the guidance of the number sequence of the target positions 55. It can be understood that the target positions 55 may be set on a curved preset path 52, so that the intelligent lawn mower 20 operates in a curved line.

Further, the mowing path generation module 424 gathers the latitude and longitude coordinate data of the target positions 55 and sends the data to the data processing module, and the data processing module projects the trajectory point to the mark layer 442 of the electronically controlled map 44 to make the latitude and longitude coordinate data of the target positions 55 correspond to the latitude and longitude coordinate data of the mark layer 442 of the electronically controlled map 44 and display the marked target position 55 on the cover layer 441, so that the current preset path 52 planning mode and operation sequence can be shown to the user.

The mowing path generation module 424 integrates the latitude and longitude coordinate data of the target positions 55 into the instruction execution subunit 43, and the instruction execution subunit 43 sends an instruction to the intelligent mower 20 according to the latitude and longitude coordinate data of the target positions 55. The main control unit 29 controls the intelligent lawn mower 20 to move from the corresponding coordinate position of No. 1 target position 55 to the corresponding coordinate position of the No.

2 target position 55. According to the latitude and longitude coordinate data information of target positions 55, the intelligent lawn mower 20 is sequentially controlled to follow the point-by-point movement in incremental order of the sequence number of target positions 55, so that the intelligent lawn mower 20 sequentially perform mowing according to the preset path 52 to complete the designated work, thereby the target positions accurately plans the mowing path and reduces the degree of deviation of the intelligent lawn mower 20 along the mowing path.

It can be understood that when the target position 55 is set to be very small, a plurality of the target positions 55 can be approximately treated as linear arrangement, and the intelligent lawn mower 20 travels in straight line following the sequence numbers of the target positions 55, so that the intelligent lawn mower can accurately perform operations following the preset path 52, including complicated straight or curved path corresponding to the preset path 52.

In an example, the target position 55 may be implemented as a position point having latitude and longitude coordinate values such that the reference point of the intelligent lawn mower 20 sequentially tracks the target position 55 such that the reference point and the target positions 55 are sequentially overlapped, thereby controlling the intelligent lawn mower 20 to follow the preset path 52.

The target position 55 may also be implemented as an area having a certain size and shape, such as a rectangle, a circle, or a line segment. In this case, the area coordinate data corresponding to the target position 55 is sent by the instruction execution subunit 43 to the main control unit 29. According to the corresponding area coordinate data, the main control unit 29 controls the intelligent lawn mower 20 to sequentially travel towards and cover the target positions 55.

The target position 55 may also be implemented as a virtual frame form of the intelligent lawn mower 20, and the main control unit 29 controls the intelligent lawn mower 20 to sequentially travel towards and cover the target positions 55.

In order to intuitively show the working state of the intelligent lawn mower 20 to facilitate the user in acquiring the mowing process of the intelligent lawn mower 20 and determining the next step of control, the intelligent lawn mower 20 also includes a lawn mower position generation module 205, the lawn mower position generation module 205 communicates with the display interface 50 of the mobile terminal 60 to selectively display the position of the intelligent lawnmower 20 in the map area of the display interface. The electronically controlled map 44 generates a virtual lawn mower, wherein the position of the virtual lawn mower in the electronically controlled map 44 corresponds to the actual position of the intelligent lawn mower 20, and corresponds to the working state, such as orientation, of the intelligent lawn mower 20. Specifically, the instruction execution subunit 43 controls the electronically controlled map 44 to display the virtual lawn mower at its corresponding position according to the real-time position information of the intelligent mower 20 analyzed by the main control unit 29, and changes the corresponding position and state of the virtual lawn mower in real time according to the real-time position information analyzed by the main control unit 29.

In an example, in order to enable the user to clearly obtain the state of boundary selection and path analysis of the intelligent mowing system, the control unit 40 creates a map slice in the electronically controlled map 44 according to the selected mowable area boundary 51 such that the mowable area boundary 51 is used as the map slice boundary, or the mowable area boundary 51 is built into the map slice boundary. The instruction execution subunit 43 controls the electronically controlled map 44 to display the mowable area boundary 51, the operating area, the preset path 52, the cut area, the uncut area, the position and simulation image of the intelligent lawn mower 20, and display one or a combination of corresponding target positions 55 and their numbers on the preset path 52.

The map slice may be a partial map, or a coordinate system, an area simulation map, an operation boundary map, and the like, which is not limited herein.

The virtual lawn mower is also projected onto the map slice by the instruction execution subunit 43, and its corresponding position is updated on the map slice in real time. When the intelligent lawn mower 20 is actually operating, it travels according to the preset path 52, and the virtual lawn mower travels on the preset path 52 correspondingly on the map slice to reflect the real-time working state of the intelligent lawn mower 20. The form of the virtual lawn mower may be the form of the virtual outer frame of the intelligent lawn mower 20, or may be a virtual form such as a dot, a rectangle, a circle, a line, a double dot, or the like.

The data analysis subunit 42 analyzes the cut area according to the traveling trajectory of the intelligent lawn mower 20, and the instruction execution subunit 43 controls the state change of the cut area of the preset path 52 on the map slice, such as the change of color or shape to distinguish the uncut area and the cut area on the map slice.

It can be understood that the map slice may be separately displayed independently on the electronically controlled map 44 or may be directly displayed integrally on the electronically controlled map 44.

Further, the mowing path generation module 424 further includes a lawn printing function. The user can upload print contents such as pictures or text, and other path data through the information processing subunit 41. The mowing path generation module 424 reads the print contents, and converts the print contents into the preset path 52 in proportion to the current mowable area boundary 51, and generates the corresponding target positions 55, so as to control the intelligent lawn mower 20 with the guidance of the target positions 55 to work on the lawn to produce graphics or text corresponding to the print contents, so as to plan and display the operation path on the map, ease operations and obtain work information and accurate route.

Figure 15:
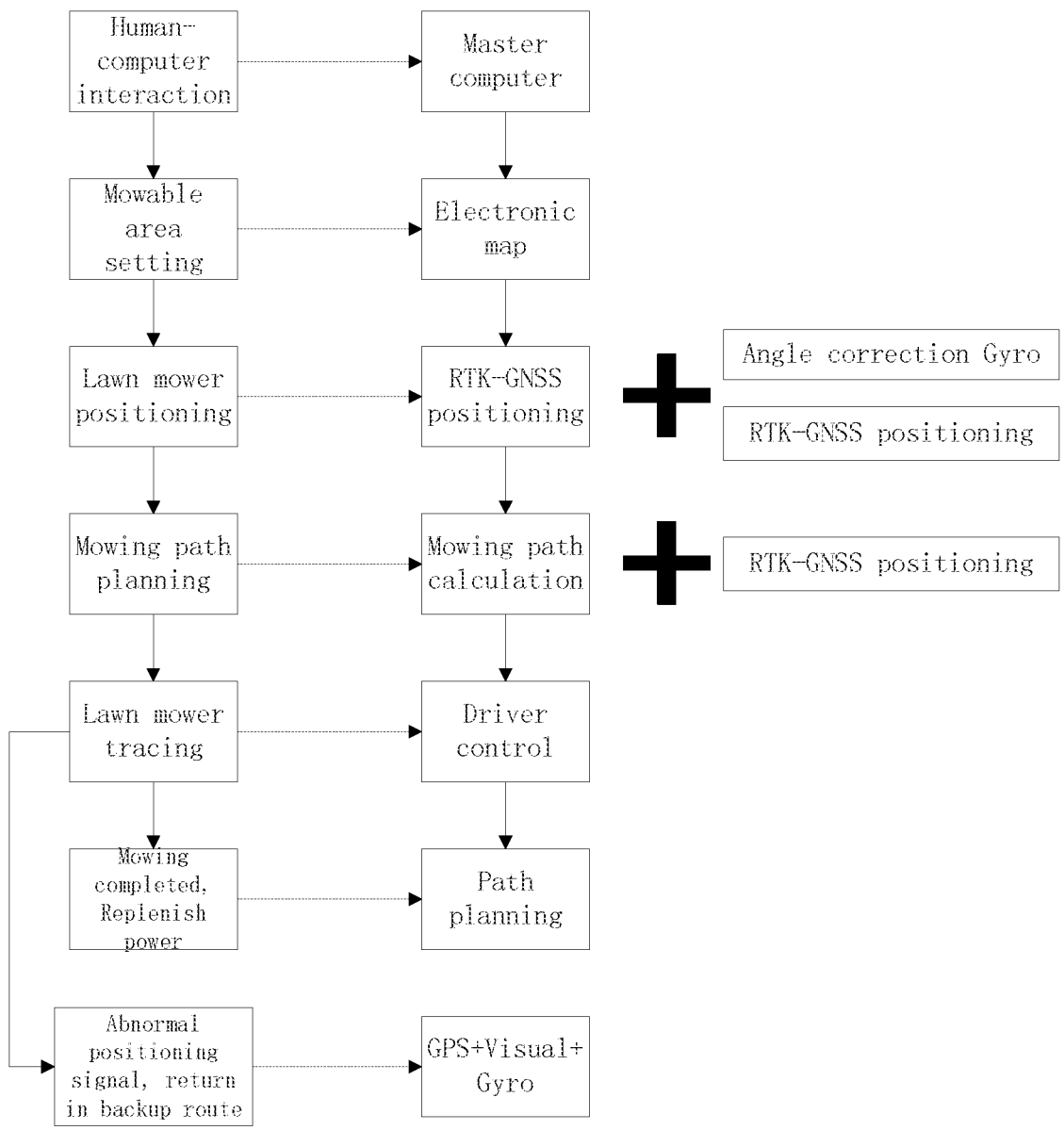
FIG. 15 is an operational flow chart of an intelligent mowing system according to an example of the present disclosure.

Referring to an example flowchart in FIG. 15, the intelligent mowing system shown sets the mowable area after human-computer interaction, and obtains the position and position of the intelligent lawn mower 20 with RTK-GNSS positioning, so that the controller 202 can perform mowing path planning and angle correction, and after the mowing is completed, perform path planning to control the intelligent lawn mower 20 to return to the charging station or the parking spot. When the satellite signal is bad, the controller 202 may locate the position and determine the path with the position sensor.

It is worth mentioning that, just like the conventional smart lawn mower systems, the control unit 40 controls the intelligent lawn mower 20 to return to the preset stop, which in the case may further include a charging station, once the intelligent lawn mower 20 completes its work.

Figure 16:
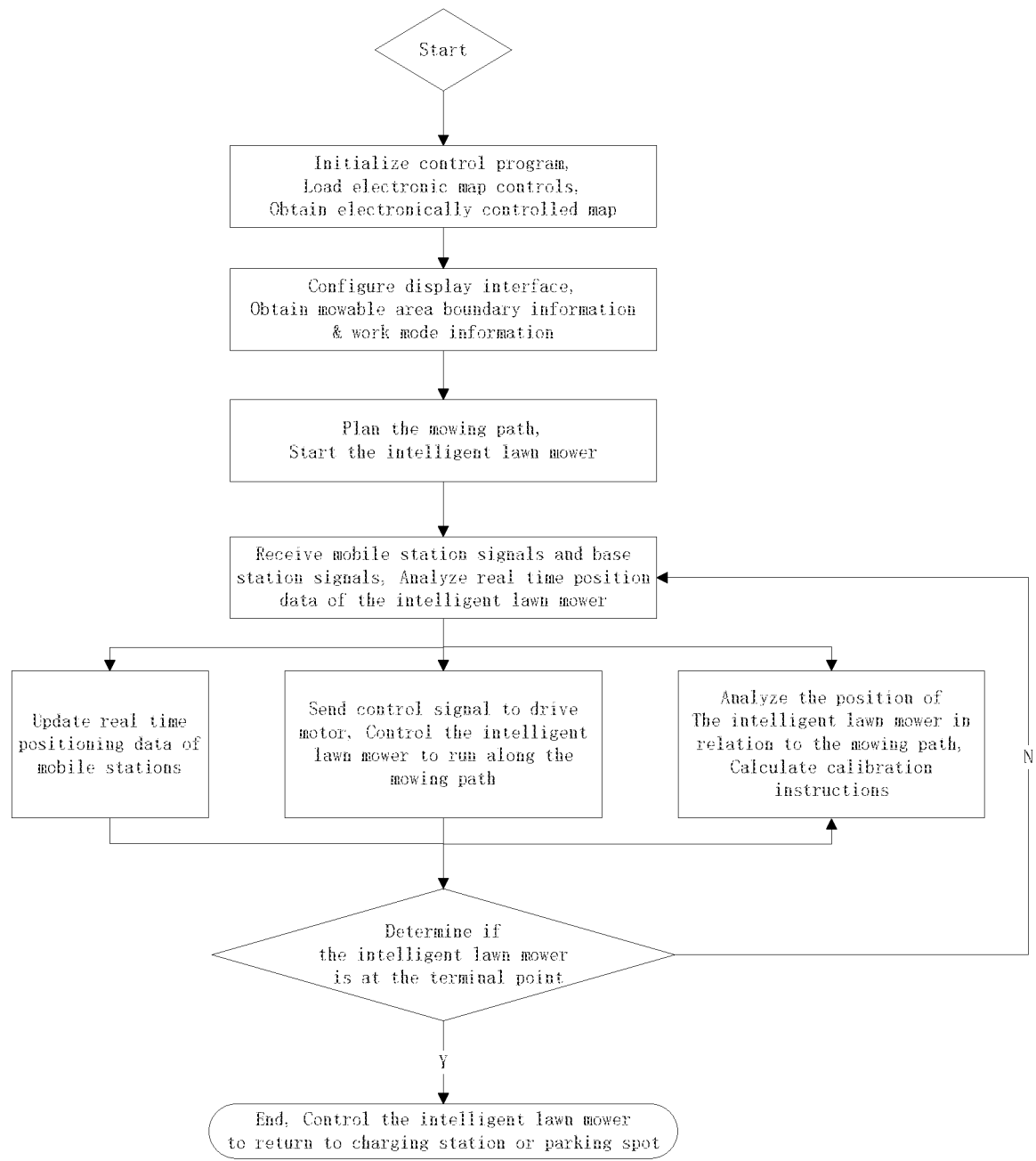
FIG. 16 is an operational flow chart of the control unit of an intelligent mowing system according to an example of the present disclosure.

Referring to FIG. 16, in an example, the steps for the operation flow of the control unit are:

A. Initialize the program, load electronic map controls, and obtain the electronic map;

B. Configure display interface, obtain the mowable area boundary information and the working mode information;

C. Plan mowing path and start the intelligent lawn mower;

D. Receive and analyze the mobile station signals and the base station signals, and analyze the real-time position data of the intelligent lawn mowers;

E1. Update real time positioning data of the mobile stations;

E2. Control the intelligent lawn mower to run along the mowing path;

E3. Analyze the position of the intelligent lawn mower in relation to the mowing path, and calculate calibration instructions;

F. Determine whether the intelligent lawnmower moves to the end of the mowing path: if no, loop step D; if yes, end and control the intelligent lawn mower to return to the parking spot or charging station.

It is worth mentioning that the display interface 50 provided by the mobile terminal is configured to display the map area and the mowable area boundary 51 set in the map area, and the mowable area boundary 51 has a first boundary 511 and a second boundary 512, and a first virtual boundary 513 adjacent to the first boundary 511 and a second virtual boundary 514 adjacent to the second boundary 512, the mowing path generation module 424 sets a plurality of target positions 55 on the first virtual boundary 513 and the second virtual boundary 514 according to the preset path 52 on the mowable area boundary 51, and a mowing path 53 is generated according to the plurality of target locations 55.

It can be understood that the first virtual boundary 513 and the second virtual boundary 514 are essentially position data information. The control unit 40 calculates and analyzes the position data information corresponding to the first virtual boundary 513 and the second virtual border 514 according to the mowable area boundary 51, and delivers the position data information to the electronically controlled map 44. The electronic map control 45 will project the first virtual border 513 and the second virtual boundary 514 onto the display interface 50, and proportionally display the relative position relationship between the first virtual boundary 513, the second virtual boundary 514 and the mowable area 54.

Referring to FIGS. 11-13, the mowable area 54 may be a rectangle, a triangle, a circle, or other irregular shapes, or a collection of multiple areas with different shapes. When the mowable area 54 is rectangular, a pair of opposite edges on the border may be selected as the first boundary 511 and the second boundary 512 respectively, and the first virtual boundary 513 and the second virtual boundary 514 may be selected in accordance with the first boundary 511 and the second boundary 512.

Referring to FIG. 12, when the mowable area 54 is a triangle, a pair of adjacent edges on the border may be selected as the first boundary 511 and the second boundary 512 respectively, and the first virtual boundary 513 and the second virtual boundary 514 may be generated accordingly. When the mowable area 54 is semicircular or approximately semicircular, the mowing path generation module 424 sets the connected arc and line segment as the first boundary 511 and the second boundary 512 respectively, and the first virtual boundary 513 and the second virtual boundary 514 may be generated accordingly.

Referring to FIG. 13, when the mowable area 54 is circular or approximately circular, the mowable area boundary 51 has a closed virtual boundary 515 surrounded in circular or approximately circular forms, wherein the closed mowable area has a closed boundary and a closed virtual boundary adjacent to the closed boundary. At this time, the corresponding closed mowable area boundary 51 of the mowable area is displayed in the map area. Correspondingly, the virtual boundary 515 includes a virtual division line 516 inside, which is generated in the mowable area 54 and divides the virtual boundary line 515 into the first virtual boundary 513 and second virtual boundary 514 relative to the first virtual boundary 513.

It can be understood that, in other closed graphics, there is a closed boundary within the closed mowable area boundary and a closed virtual boundary 515 adjacent to the closed boundary.

The first virtual boundary 513 and the second virtual boundary 514 are generated in the mowable area 54 with respect to the first boundary 511 and the second boundary 512, and preferably the first virtual boundary 513 is substantially parallel to the first boundary 511, and the second virtual boundary 514 is substantially parallel to the second boundary 512.

In an example, the first boundary 511 of the mowable area is substantially parallel to the first virtual boundary 513 and the spacing thereof ranges from 0.5 to 2 meters, and the second boundary 512 of the mowable area is substantially parallel to the second virtual boundary 514 and the spacing thereof ranges from 0.5 to 2 meters. When the intelligent lawn mower 20 travels along the first virtual border 513 and the second virtual border 514, its effective cutting range just covers the first boundary 511 and the second boundary 512. Therefore, when the intelligent lawn mower 20 works along the first virtual boundary 513 and the second virtual boundary 514, it is controlled to cut near the first boundary 511 and the second boundary 512. In this way, the probability that the intelligent lawn mower 20 miss cuts grass near the boundary or cuts beyond range may be effectively reduced.

It can be understood that the first boundary 511 and the first virtual boundary 513 may overlap, and the second boundary 512 and the second virtual boundary 514 may also overlap, and the manner of tracking the first virtual boundary 513 and the second virtual boundary 514 needs to be adjusted for this situation, such as setting the side of the intelligent mower 20 to be aligned with the first virtual boundary 513 and the second virtual boundary 514 such that the cutting range of the intelligent lawn mower 20 is controlled to be within the boundary.

Similarly, the virtual boundary 515 and the mowable area boundary 51 may be relatively parallel and spaced between 0.5 and 2 meters, or the virtual boundary 515 and the mowable area boundary 51 may overlap.

In an example, the preset path 52 is a creeping line path, in other words, the straight-line round-trip mode. Set a plurality of substantially equal-spaced target positions 55 on the first virtual boundary 513 and the second virtual boundary 514, and the intelligent lawn mower 20 can sequentially walk through the target positions 55 on the first virtual boundary 513 and the second virtual boundary 514 in a creeping line path.

Figure 14:
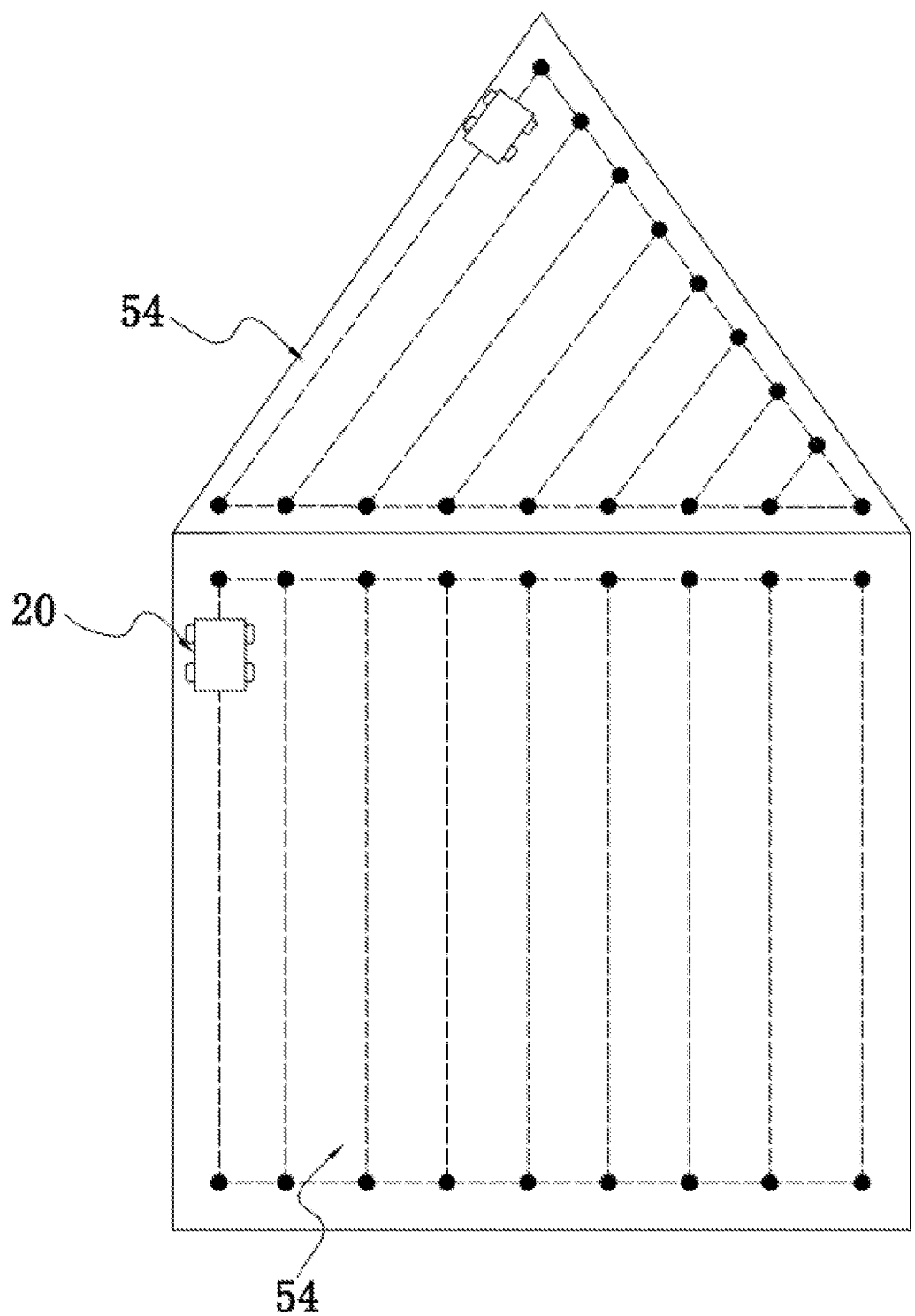
FIG. 14 is a schematic diagram of the path planning in yet another mowable area of an intelligent mowing system according to an example of the present disclosure.

Another path planning schematic in a mowable area is discussed herein with reference to FIG. 14, according to an example of the intelligent mowing system. As shown in FIG. 14, during the actual operation, the mowable area 54 may also be divided into a plurality of closed sub mowable areas 541, and the sub mowable areas 541 are operated separately. Specifically, when the mowing path generation module 424 detects that the currently acquired mowable area 54 is irregular, and that the first virtual boundary 513 and the second virtual boundary 514 cannot be established, then the mowable area 54 is divided into a plurality of sub mowable areas 541, and the divided sub mowable areas 541 are morphological sections of different shapes and sizes, such as a combination of a rectangle and a semicircle. The sub mowable areas 541 can each generate a first boundary 511 and a second boundary 512, a first virtual boundary 513 and a second virtual boundary 514, and determine the mowing path 53 to control the intelligent lawn mower 20 to work along mowing path 53 in order.

The preset path 52 may be automatically generated by the mowing path generation module 424 from the selected mowable area boundary 51. The preset path 52 or the mowable area boundary 51 is selected from one or a combination of a map simulation mode, a data selection mode, and a field routing mode.

It can be understood that the mowing path generation module 424 may also directly calculate and analyze the preset path 52 and generate a corresponding mowing path 53 without displaying the electronically controlled map 44. The display interface 50 is not a necessary setting with respect to the intelligent mowing system.

The first virtual boundary and the second virtual boundary act as reference coordinates for path planning of the mowable area 54. In particular, a plurality of the target positions 55 are set at the first virtual boundary 513 and the second virtual boundary 514, and the target positions 55 are sequentially numbered according to the preset path 52, and the intelligent lawn mower 20 is controlled to sequentially pass the target positions 55 following the numbering of the target positions 55 to set the mowable path 53.

Set a plurality of the target positions 55 for multiple types of preset paths 52 planning. The target positions 55 may be used as a reference points, so that the intelligent lawn mower 20 can be guided to travel along straight lines between every two target positions 55. The target positions 55 may also be used as guiding points to calibrate intelligent lawn mower 20 multiple times during mowing process, thereby greatly improves the ability to track the preset path 52 of intelligent lawn mower 20.

Further, a target position 55 is a position point with latitude and longitude coordinates, so the intelligent lawn mower 20 tracks sequential latitude and longitude coordinates, thereby improves the accuracy in the mowing process of the intelligent mower 20 and ensures that the intelligent lawn mower 20 operates in strict accordance with the preset path 52.

The data analysis subunit 42 further includes a path calibration module 422 that detects the tracking process of the intelligent lawn mower 20 at a plurality of target locations 55 during the operation. When the intelligent lawn mower 20 is offset from the preset path 52, the path calibration module 422 calibrates the working direction of the intelligent lawn mower 20 to ensure that the intelligent lawn mower 20 accurately travels along the straight lines between every two target positions 55, so as to ensure that the intelligent lawn mower 20 effectively operates along the preset path 52, improving the work efficiency of the intelligent lawn mower 20 and preventing repeat cut or miss cut to improve the quality of the lawn and save energy.

The path calibration module 422 generates a calibration section 521 on the preset path 52 according to the preset path 52 selected by the mowing path generation module 424. The calibration section 521 has a predetermined line width, and the predetermined line width is the uniform width of the calibration section 521, denoted by N. The predetermined line width is set to be greater than or equal to the distance between the first antenna 321 and the second antenna 331. The distance between the first antenna 321 and the second antenna 331 is represented by M, that is, N>=M. The center line of the calibration section 521 and the preset path 52 overlap such that the calibration section 521 covers the preset path 52 symmetrically with the preset path 52 as the symmetry axis of the calibration section 521.

Figure 17:
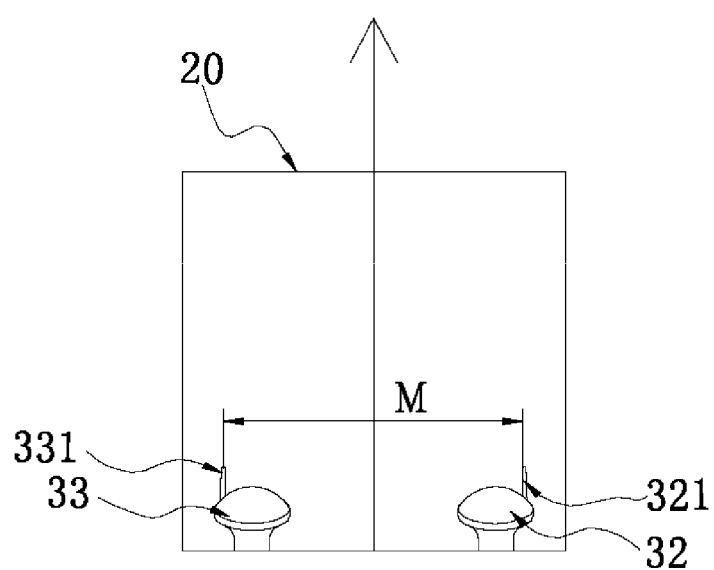
FIG. 17 is a schematic diagram of position analysis of an intelligent lawn mower according to an example of the present disclosure.

Referring to FIG. 17, a schematic diagram of position analysis of an example of the intelligent lawn mower, the path calibration module 422 turns on a state calibration mode based on the specific values of the mobile station group, the mode categorizes the offset state into three states, a direction offset state, a partial offset state, and a complete offset state. The offset state may be determined by the positional relationship between the mobile station group and the calibration section 521. The direction of the intelligent lawn mower 20 may be determined by making a perpendicular bisector between the first mobile station 32 and the second mobile station 33, and the latitude and longitude position coordinates of the intelligent lawn mower 20 may be determined by the positioning data of the first mobile station 332 and the second mobile station 33.

In an example, the perpendicular distance of the mobile station group to the preset path 52 is used as a criterion for judging the offset state.

Based on the real-time position latitude and longitude coordinate analysis result of the mobile station group by the main control unit 29, when the path calibration module 422 detects that the intelligent lawn mower 20 is not traveling along the current preset path 52, the path calibration module 422 calculates the linear perpendicular distance of the two mobile stations 30 to the preset path 52. When the double linear perpendicular distances from the two mobile stations 30 to the preset path 52 are both less than the predetermined line width, the mobile station 30 is completely located inside the calibration section 521, and it is determined that the intelligent lawn mower 20 is currently in the direction offset state.

The controller 202 is electrically connected or communicated with the display interface 50 and the lawn mower position generation module 205, and is configured to control the intelligent lawn mower 20 to operate generally within a predetermined line width of the mowing path 53, according to the relative positional relationship between the position of the intelligent lawn mower 20 and the mowing path 53.

Figure 18:
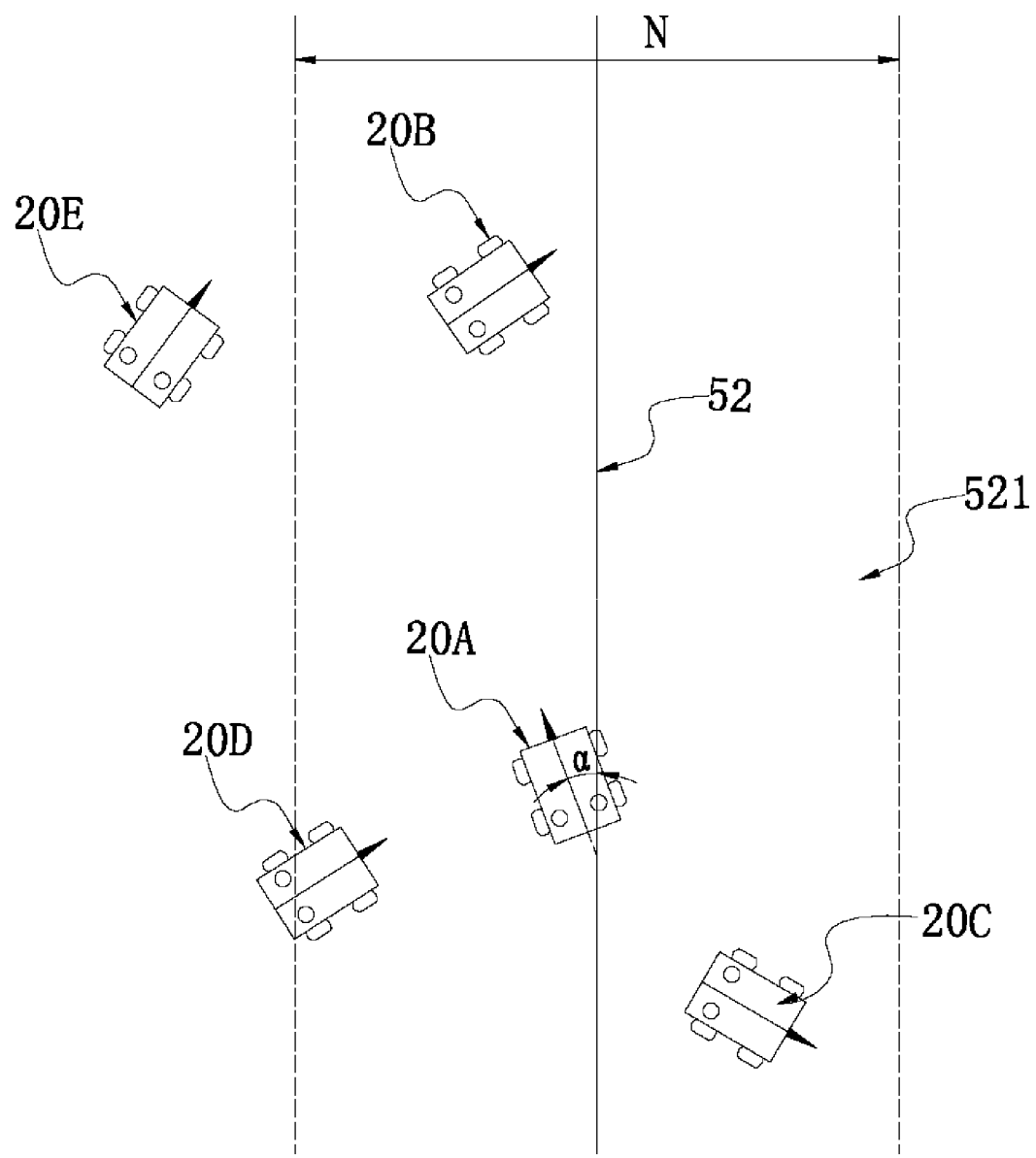
FIG. 18 is a state chart diagram of position offset state of an intelligent lawn mower according to an example of the present disclosure.

Referring to FIG. 18, several example offset states are shown. When the double linear perpendicular distance from one mobile station of the two mobile stations 30 to the preset path 52 is less than the predetermined line width, and the double linear perpendicular distance from the other mobile station of the two mobile stations 30 to the preset path 52 is greater than the predetermined line width, one of the two mobile stations is inside the calibration section 521 and the other one of the two mobile stations is outside the calibration section 521. Therefore, it is determined that the intelligent lawn mower 20 is currently in the partial offset state.

When the double linear perpendicular distances from the two mobile stations 30 to the preset path 52 are both greater than the predetermined line width, the mobile station 30 is completely located outside the calibration section 521, and it is determined that the intelligent lawn mower 20 is currently in the complete offset state.

The path calibration module 422 calculates the calibration path based on the preset path 52 and the position information of the current intelligent lawn mower 20, and sends the computation result to command execution subunit 43 to control the intelligent lawn mower 20 to move according to the latitude and longitude coordinate data of the calibration path to perform path calibration, by which the intelligent lawn mower 20 can be able to travel along straight lines between every two target positions 55 of the preset path 52, and the tracking precision of the intelligent lawn mower 20 is greatly improved.

When the intelligent lawn mower 20 is located on the preset path 52, the reference point is set on the preset path 52, and the reference point is used as a tangency point, and the path calibration module 422 defines the tangential angle of the preset path 52 and the current direction of the intelligent lawn mower 20 to be α. The path calibration module 422 is provided with a positive threshold angle β and a negative threshold angle θ. By comparing the magnitudes of α and β, θ, the current direction offset state of the intelligent lawn mower 20 is determined, and different solutions are triggered.

In every certain time interval, the path calibration module 422 obtains the position information of the intelligent lawn mower 20, and by the before and after positional relationship of the intelligent lawn mower 20, the path calibration module 422 learns the traveling state of the intelligent lawn mower 20, such as speed, direction, and current position. The path calibration module 422 obtains the relationship between the intelligent lawn mower 20 and the preset path 52 in real time, and determines the direction offset state as a converging state, a diverging state or an inline state by the traveling state of the intelligent lawn mower 20.

As shown in FIG. 18, 20E is in complete offset state; 20D is in partial offset state; 20A, 20B, and 20C are in direction offset state. Specifically, 20A is in online state, 20B is in converging state, and 20C is in diverging state.

When the intelligent lawn mower 20 is traveling on the preset path 52, the reference point overlaps with the preset path 52 at this time, and it is determined that the current position is in the online state. When the intelligent lawn mower 20 is deviated from the preset path 52 and is traveling closer and closer, the reference point is gradually closer to the preset path 52, and it is determined that the current position is in the converging state. When the intelligent lawn mower 20 is deviated from the preset path 52 and is traveling farther and farther, the reference point is gradually farther away from the preset path 52, and it is determined that the current position is in the diverging state.

The path calibration module 422 is provided with a direction calibration method. When the intelligent lawn mower 20 is traveling on the preset path 52, the reference point overlaps with the preset path 52. It is determined that the current position is in the online state, and the current value of a is obtained. When |α|>β, the command "stop and reverse α degrees, then go straight" is sent to the main control unit 29 to control the intelligent lawn mower 20. In the online state, the value of β may preferably be 30 degrees.

When the intelligent lawn mower 20 is deviated from the preset path 52 and is traveling closer and closer, the reference point is gradually closer to the preset path 52. It is determined that the current position is in the converging state, and the current value of α is obtained. When |α|<β, send the command "stop, change direction towards the preset path, then go straight to the preset path and then turn". When |α|>θ, send the command "stop, turn back, change direction towards the preset path, then go straight to the preset path and then turn". When β<|α|<θ, send the command "stop, change direction towards the preset path, then go straight to the preset path and then turn". In the converging state, the β may preferably be 75 degrees, and θ may preferably be 105 degrees.

When the intelligent lawn mower 20 is deviated from the preset path 52 and is traveling farther and farther, the reference point is gradually farther away from the preset path 52. It is determined that the current position is in the diverging state, and the command "stop, change direction to the converging state" is sent. The intelligent mower 20 is controlled to return to the correct direction with the direction calibration method in the converging state.

When it is determined that the intelligent lawn mower 20 is in the complete offset state, the path calibration module 422 analyzes a corresponding calibration path, and based on the calibration path result, controls the traveling direction of the intelligent lawn mower 20 to be toward the preset path 52, reduces the speed of the intelligent lawn mower 20, and when the first antenna 321 and the second antenna 331 enter the calibration section 521, determines that the intelligent lawn mower 20 is switched to the direction offset state and performs secondary path calibration with the direction calibration method.

When it is determined that the intelligent lawn mower 20 is in a partial offset state, the path calibration module 422 calculates a corresponding calibration path, and based on the calibration path result, reduces the speed of the intelligent lawn mower 20 and determines the offset state of the intelligent lawn mower 20 after traveling at a low speed for some distance. If the intelligent lawn mower 20 shifts to the direction offset state, perform path calibration with the direction calibration method. If the intelligent lawn mower 20 shifts to the complete offset state, repeat the path calibration method of the complete offset state until the intelligent mower 20 is in the direction offset state.

It is worth mentioning that the calibration of the path offset state of the intelligent lawn mower 20 may also adopt a curve calibration method, when the intelligent lawn mower 20 is in a complete offset state or a partial offset state, the path calibration module 422 may send an instruction to control the intelligent lawn mower 20 to reduce speed, and control the driving wheels 23 of the intelligent lawn mower 20 to travel in different speed such that the intelligent lawn mower 20 wraps around the preset path 52 through a curve path, and then the direction is changed to the direction of the preset path 52 and the speed recovers.

It can be understood that, in addition to the state calibration mode, the path calibration module 422 may also calibrate the operation process of the intelligent mower 20 with a section calibration mode. The path calibration module 422 generates the calibration section 521 from the preset path 52, and acquires the position latitude and longitude coordinate data information of the calibration section 521. The path calibration module 422 checks whether the real-time position coordinates of the mobile station group fall within the calibration section 521.

The path calibration module 422 establishes an actual work route function of the intelligent lawn mower 20, and predicts a travel route of the intelligent lawn mower 20 based on the real-time position coordinate information of the mobile station group. When the path calibration module 422 detects that the predicted travel route of the intelligent lawn mower 20 does not conform with the preset path 52, the path calibration module 422 controls the intelligent lawn mower 20 to change the direction so that the direction of the intelligent lawn mower 20 and the direction of the tangent line at the preset path 52 are the same.

If the path calibration module 422 detects that one or more coordinates of the mobile station 30 are located outside the calibration section 521, according to the latitude and longitude coordinate data of the reference point of the current intelligent lawn mower 20, the path calibration module builds a connection function of the preset path 52 to analyze the optimal calibration route and controls the intelligent lawn mower 20 to load the calibration route to return to the preset path 52.

In an example, the main control unit 29 uses a ROS robot operating system and is disposed in the intelligent lawn mower 20. ROS robot operating system is an open source robot meta-operating system that establishes a cooperative robot software development environment in a global scale. ROS robot operating system may be used to assist completing the position analysis of the main control unit 29 and to control the execution of the instructions.

It is worth mentioning that the memory 46 of the control unit 40 records the record of each job of the intelligent mowing system, such as the preset path 52 record, the mowable area boundary 51 record, the job state record, and the job record can be transmitted to save on the cloud by the information processing subunit 41. The user can directly retrieve the job setting records for the next job, so that the mowing operation in the same area or in the same path can be performed without repeating the setting.

It is worth mentioning that the intelligent lawn mower 20 as shown in FIG. 4A may also include the display interface 50 and the display interface 50 is connected to the control unit 40, and the control unit 40 controls the electronically controlled map 44 or the electronic slice to be displayed on the display interface 50, or display the walking path on a display interface 50 such as a map interface of a third-party mobile terminal such as a mobile phone, so that the user can be informed of the actual mowing path of the intelligent lawn mower 20 and the cut area information remotely on the display interface 50 of the intelligent lawn mower 20, or on the terminal such as a mobile phone. Here, it should be noted that the map interface in an example of the present disclosure may be a Google map, a Gaude map or some other map, which is not limited herein. The map interface may be set on the intelligent lawn mower 20, or may be set on a third-party mobile terminal such as a mobile phone or a wristwatch.

As shown in FIG. 4C, the control unit 40 may be directly installed in the intelligent lawn mower 20, and the intelligent lawn mower 20 displays the display interface 50. It can be understood that the display interface 50 is not necessary. The intelligent lawn mower 20 may be installed with the control unit 40 and not equipped with the display interface 50. The control unit 40 may run and directly control the operation of the intelligent lawn mower 20 without displaying the electronically controlled map 44.

After the mowable area 54 or the boundary of intelligent lawn mower 20 is determined, the user sets mowing mode parameters such as mowing speed and mowing path on the display interface 50 of the intelligent lawn mower 20 or a mobile terminal such as a mobile phone that communicates with the intelligent lawn mower 20, and then send mowing signal to the control unit 40 of the intelligent lawn mower 20. The control unit 40 performs automatic and/or manual mowing in the mowable area 54 according to the set mowing mode.

Further, in an example, the control unit 40 may be directly set in the intelligent lawn mower 20, so that the intelligent lawn mower 20 can be controlled without requiring the mobile terminal to install the control unit 40.

Referring to FIG. 3, since the mobile station 30 of the intelligent lawn mower 20 receives signals with a delay or a lag, that is, the mobile station 30 of the intelligent lawn mower 20 receives at time T1+ the GNSS position signal transmitted by the real-time dynamic (RTK)-GNSS navigation system at time T1; and the intelligent lawn mower 20 has actually moved to the position at time T1+.

For example, ideally, when the real-time dynamic (RTK)-GNSS navigation system in the sky sends the GNSS position signal at time T1, the intelligent lawn mower 20 on the lawn should receive GNSS position signal sent at time T1 by the real-time dynamic (RTK)-GNSS navigation system at time T1. However, due to signal delay or lag, the GNSS position signal received by the intelligent lawn mower 20 on the lawn at time T1 is the GNSS position signal sent by real-time dynamic (RTK)-GNSS navigation system at time T1−, and by analogy, the GNSS position signal received by the intelligent lawn mower 20 on the lawn at time T1+ is sent by the real-time dynamic (RTK)-GNSS navigation system at time T1.

Thus, when the GNSS position signal received by the mobile station 30 of the intelligent lawn mower 20 is on the mowable area boundary 51, the intelligent lawn mower 20 may have actually moved out of the mowable area boundary 51, and the actual position deviation or error is the distance obtained by multiplying the speed v of the intelligent lawn mower 20 and the delay time which is generally around 1 s. The above situation occurs due to the problem of lag or delay in using the real-time dynamic (RTK)-GNSS navigation system.

Further, when the traditional smart lawn mower works near the border of the mowable area, due to lack of planning, the cases of miss cut or cut out of range are prone to happen for the grass area near the mowable area boundary. A solution needs to be proposed to address the problem of mowing the border of the mowable area, and to improve the mowing precision of the intelligent lawn mower 20 near the mowable area boundary 51, thereby improves the overall precision of the mowing operation of the intelligent lawn mower 20.

In particular, when the mowable area boundary 51 is irregular or semi-closed, the overall path planning of the mowable area 54 is difficult, and a specifically planned linear path is often needed.

In order to alleviate the influence on the actual mowing position deviation of the intelligent lawn mower 20 from the delay or lag of the mobile station 30 receiving the real-time dynamic (RTK)-GNSS navigation system GNSS position signal, and to prevent the intelligent lawn mower 20 from miss cut or cut out of the mowable area boundary, reduce the mowing speed at the mowable area boundary 51 such that when the intelligent mowing system detects a substantial deviation between the intelligent lawn mower 20 and the preset path 52, the adjustment instructions can be given promptly to pull back the intelligent lawn mower 20 before the deviation is too large, thereby improving the operation precision of the intelligent lawn mower 20, especially the mowing precision at the mowable area boundary 51.

Referring to FIG. 4C, the intelligent lawn mower 20 includes a virtual mowable area boundary setup module 203, which is electrically connected or communicated with the display interface 50 to set a virtual mowable area boundary 515A inside the mowable area boundary 51, and selectively display the set virtual mowable area boundary 515A within the mowable area boundary 51 on the display interface.

Figure 19:
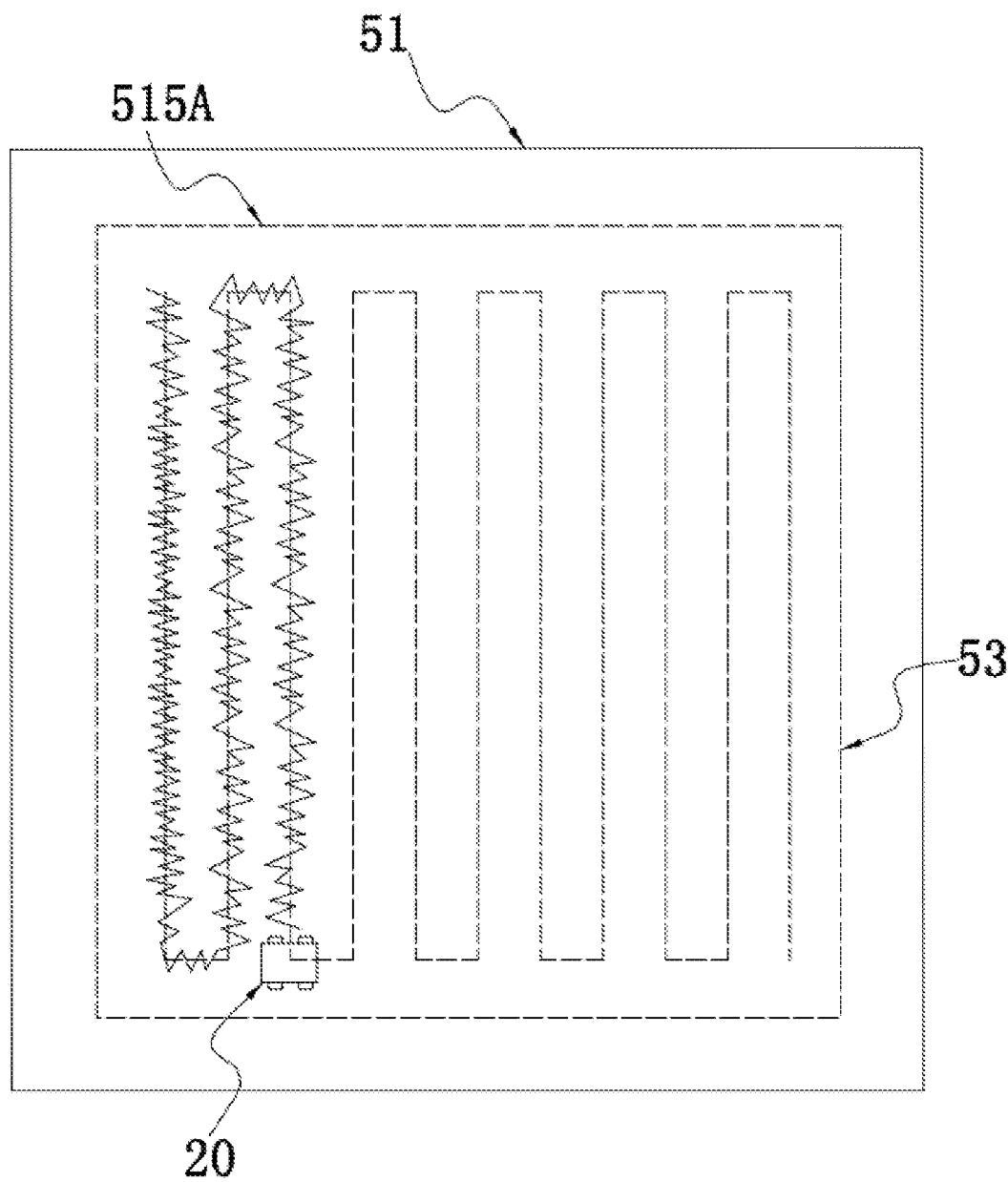
FIG. 19 is a schematic diagram of an intelligent lawn mower operating inside the virtual mowable area boundary according to another example of the present disclosure.
Figure 20:
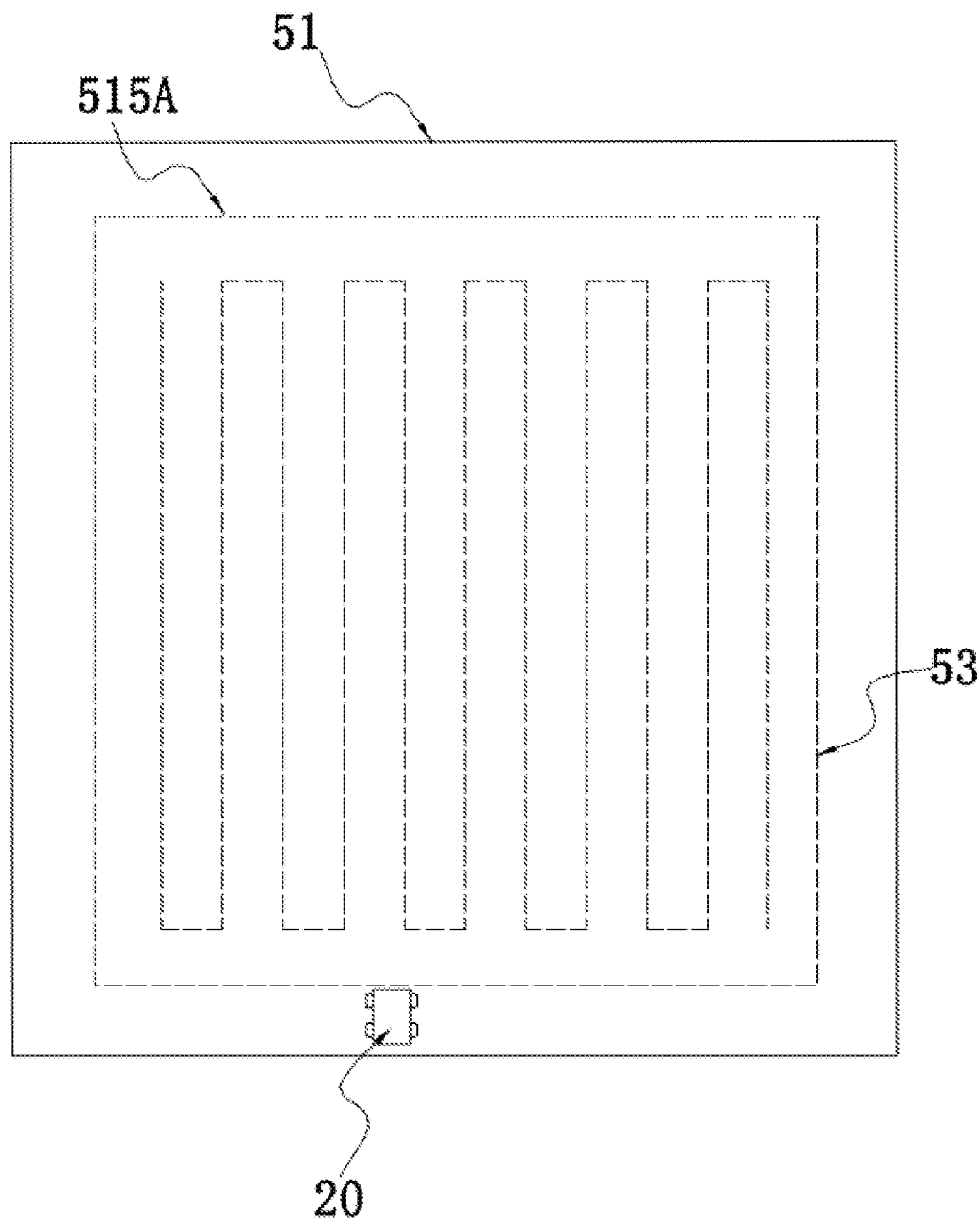
FIG. 20 is a schematic diagram of an intelligent lawn mower operating outside the virtual mowable area boundary according to another example of the present disclosure.

Referring to another example of the disclosure, FIG. 19 depicts a schematic diagram of an intelligent lawn mower operating inside the virtual mowable area boundary and FIG. 20 depicts a schematic diagram of an intelligent lawn mower operating outside the virtual mowable area boundary. As shown in FIGS. 19-20, the controller 202 is electrically connected or communicated with the display interface and virtual mowable area boundary setup module 203, and the controller 202 is configured to control the intelligent lawn mower 20 to travel at a first speed inside the virtual mowable area boundary 515A, and to travel at a second speed outside the virtual mowable area boundary 515A, wherein the second speed is less than the first speed.

The path calibration module 422 is communicably coupled to the controller 202, and the path calibration module 422 calibrates the path offset state of the intelligent lawn mower 20. The mowable area boundary 51 is selected by a map simulation mode, a data selection mode, and a field routing mode.

The intelligent lawn mower 20 further includes a mowing path generation module 424 that generates a random or ordered mowing path inside the mowable area boundary 51 and the controller 202 controls the intelligent lawn mower 20 to perform mowing along the mowing path.

The mowing path generation module 424 sets a plurality of target positions on the virtual mowable area boundary 515A, and generates the mowing path inside the mowable area boundary 51 according to the plurality of target positions.

The virtual mowable area boundary setup module 203 sets a virtual mowable area boundary 515A inside the mowable area boundary 51 to distinguish different mowable areas, wherein the virtual mowable area boundary 515A and the mowable area boundary 51 is spaced apart in the running or mowing direction by a distance greater than or equal to the product of the speed v of the intelligent lawn mower 20 and the delay time, that is, a distance greater than or equal to the position error of the intelligent lawn mower 20.

Specifically, within the virtual mowable area boundary 515A, the intelligent lawn mower 20 travels at a first fast speed or a first speed and may operate within the virtual mowable area boundary 515A with a preset path or rule; in the area between the virtual mowable area boundary 515A and the mowable area boundary 51, that is, when the intelligent lawn mower 20 exceeds the virtual mowable area boundary 515A but is still within the mowable area boundary 51, the intelligent lawn mower 20 travels at a second slow speed or a second speed, wherein the second speed is less than the first speed. For example, the intelligent lawn mower 20 travels at a speed of 1 to 1.5 m/s inside the virtual mowable area boundary 515A; whereas in the area between the virtual mowable area boundary 515A and the mowable area boundary 51, the intelligent lawn mower 20 travels at a speed less than or equal to 0.5 m/s. In the case where the mobile station 30 suffers a delay in receiving the GNSS position signal, the intelligent lawn mower 20 may travel at a rather slow speed between the virtual mowable area boundary 515A and the mowable area boundary 51, and thus the impact of delay can be greatly reduced. It should be noted that, when the intelligent lawn mower 20 performs mowing along a mowing path, the actual operating path of the intelligent lawn mower 20 may be meandering due to wheel slip, grass vegetation and uneven ground, as shown in FIG. 19, but overall, the mowing is still performed generally along the mowing path.

Figure 21:
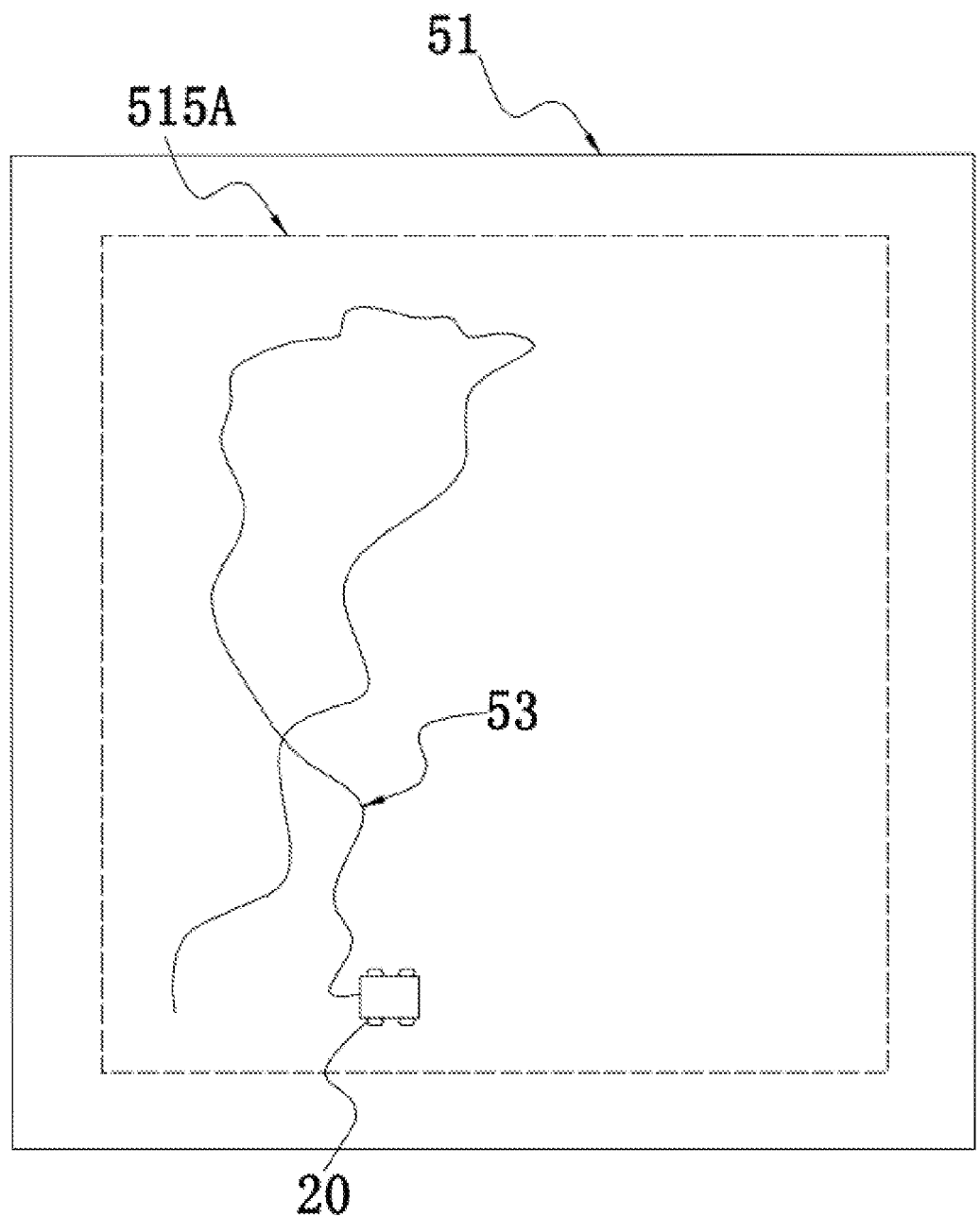
FIG. 21 is a schematic diagram of an intelligent lawn mower operating inside the virtual mowable area boundary with a random path according to another example of the present disclosure.

FIG. 21 depicts a schematic diagram of the intelligent lawn mower operating along a random path within the virtual mowable area boundary, according to another example of the present disclosure. As shown in FIG. 21, the mowing path 53 is an irregular curve. Intelligently traveling different mowable areas at different speeds can greatly reduce the impact from the delay of mobile station 30 receiving signals.

Figure 22:
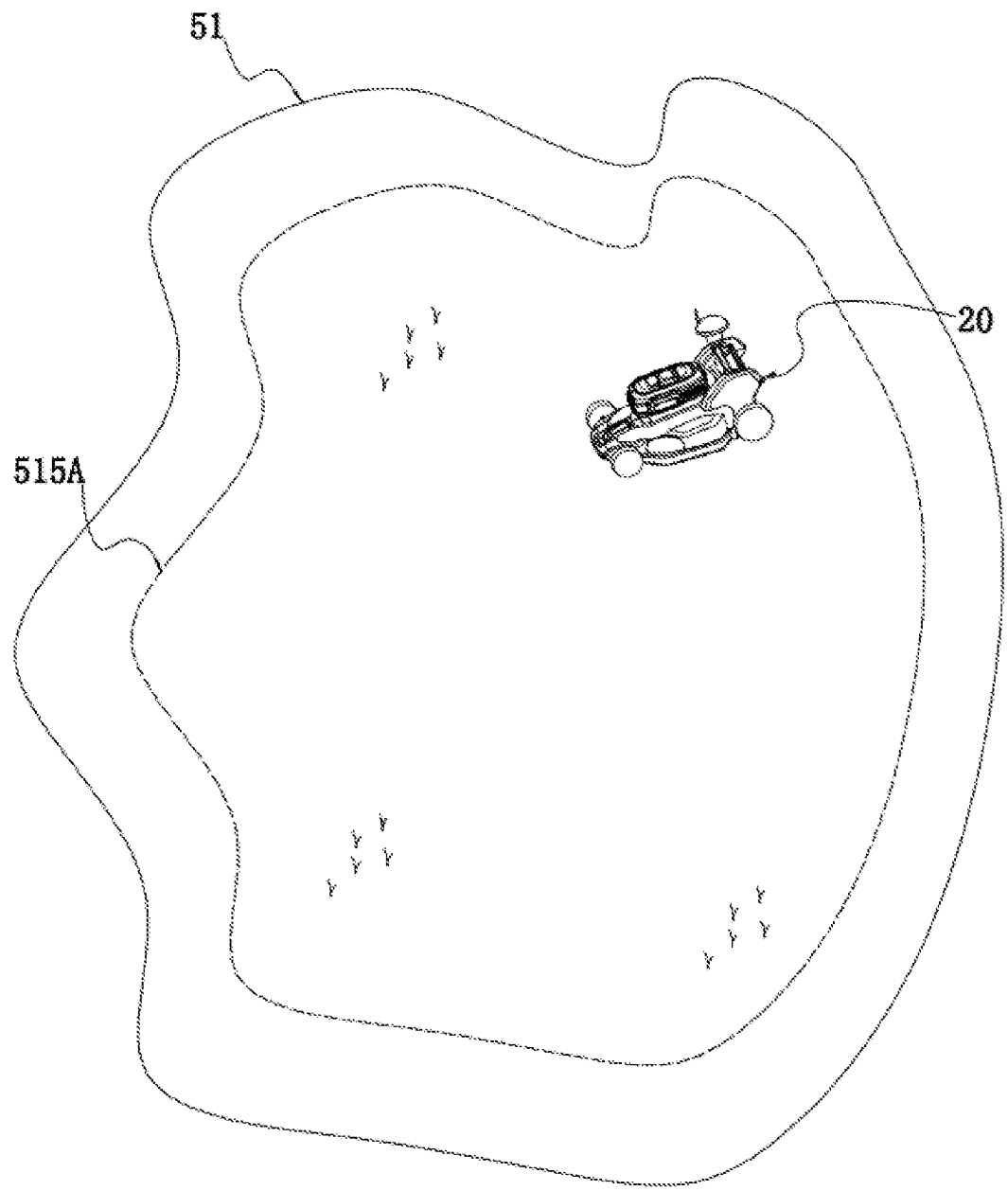
FIG. 22 is a schematic diagram of an intelligent lawn mower operating inside an irregular mowable area boundary according to another example of the present disclosure.

FIG. 22 depicts a schematic diagram of the intelligent lawn mower operating in an irregular mowable area boundary, according to another example of the present disclosure. Within the irregular mowable area boundary, the intelligent lawn mower 20 may perform mowing randomly, or may perform mowing in an orderly manner, according to the preset path.

Figure 23:
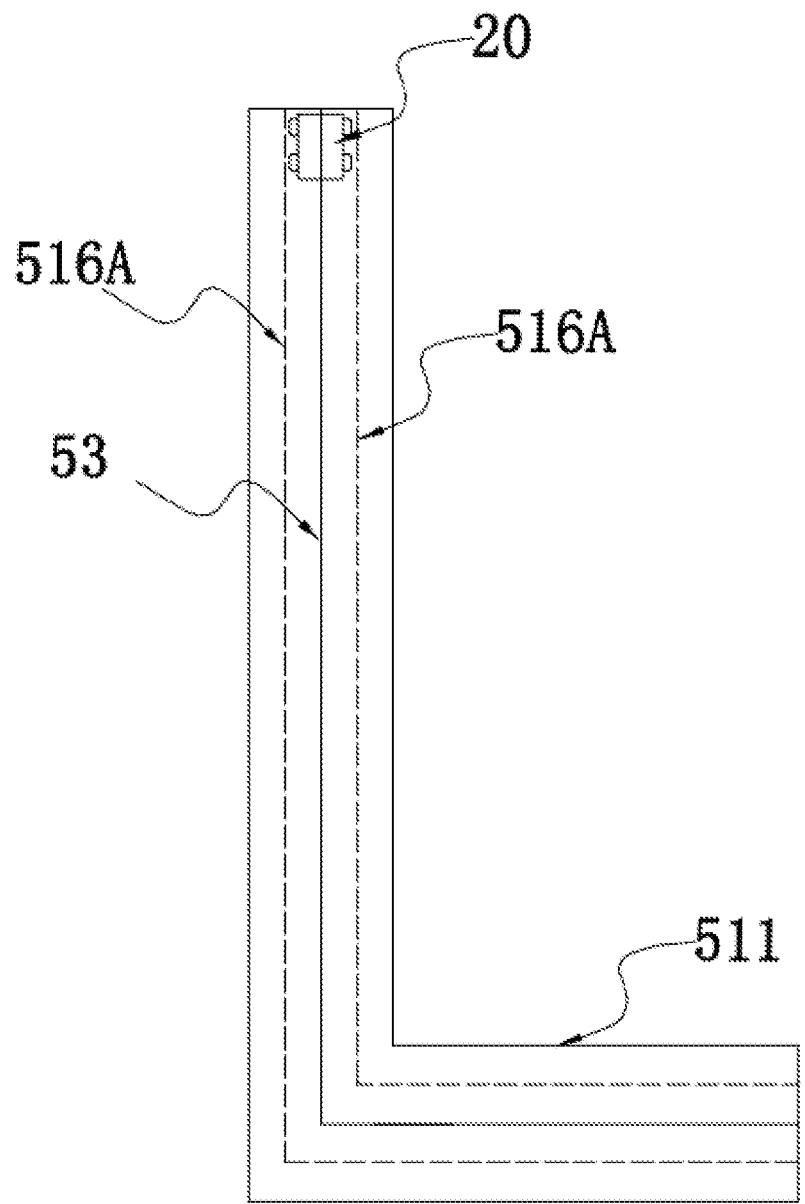
FIG. 23 is a schematic diagram of an intelligent lawn mower operating inside another irregular mowable area boundary according to another example of the present disclosure.

FIG. 23 depicts a schematic diagram of the intelligent lawn mower operating in another irregular mowable area boundary, according to another example of the present disclosure. Further, in this example, differential operation control along the mowing path 53 may also be implemented. Therefore, it is possible to plan a path in a corner or a semi-closed, open, closed part or partial area, or a regular or an irregular area, especially an irregular area, in the mowable area boundary 51. By directly setting the linear mowing path 53 and flexibly matching the corner or the irregular area of the mowable area, and setting the differential operation mode, the mowing precision can be improved.

Referring again to FIG. 4C, the intelligent lawn mower 20 includes a virtual mowing boundary setup module 204, which is electrically connected or communicated with the display interface 50 to set a virtual mowing boundary 516A on both sides of the mowing path 53, and selectively display the set virtual mowing boundary 516A within the mowable area boundary 51 on the display interface.

The virtual mowing boundary setup module 204 sets a mowable boundary 511 outside the virtual mowing boundary 516A, and the mowable boundary 511 is defined as the operating range of the intelligent lawn mower 20 on the mowing path 53, and the intelligent lawn mower 20 performs mowing inside the mowable boundary 511.

The controller 202 sets an electrical connection or communication with the display interface and the virtual mowing boundary setup module 204, and the controller 202 is configured to control the intelligent lawn mower to run at a first speed within the virtual mowing boundary 516A and to run at a second speed when the intelligent lawn mower exceeds the virtual mowing boundary 516A, wherein the second speed is less than the first speed.

The path calibration module 422 is communicably coupled to the controller 202, and the path calibration module 422 calibrates the path offset state of the intelligent lawn mower. The mowable area boundary 51 is selected by one of a map simulation mode, a data selection mode, and a field routing mode.

The intelligent lawn mower 20 further includes a mowing path generation module 424 that generates a random or ordered mowing path inside the mowable area boundary 51 and the controller 202 controls the intelligent lawn mower 20 to perform mowing along the mowing path 53. In an example, the virtual mowing boundary is generated on both sides of the mowing path 53, and spacing between the virtual mowing boundary and the mowing path ranges from 0.5 to 1 m.

Specifically, within the virtual mowing boundary 516A, the intelligent lawn mower 20 travels at a first fast speed or a first speed and may operate within the virtual mowing boundary 516A with a preset path or rule; in the area between the virtual mowing boundary 516A and the mowable boundary 511, that is, when the intelligent lawn mower 20 exceeds the virtual mowing boundary 516A but is still within the mowable boundary 511, the intelligent lawn mower 20 travels at a second slow speed or a second speed, wherein the second speed is less than the first speed. For example, the intelligent lawn mower 20 travels at a speed of 1 to 1.5 m/s inside the virtual mowing boundary 516A; whereas in the area between the virtual mowing boundary 516A and the mowable boundary 511, the intelligent lawn mower 20 travels at a speed less than or equal to 0.5 m/s. In the case where the mobile station 30 suffers a delay in receiving the GNSS position signal, the intelligent lawn mower 20 may travel at a rather slow speed between the virtual mowing boundary 516A and the mowable boundary 511, and thus the impact of delay can be greatly reduced. It should be noted that when the intelligent lawn mower 20 performs mowing on a preset path, the actual operating path of the intelligent lawn mower 20 may be meandering due to wheel slip, grass vegetation and uneven ground, but overall, the mowing is still performed generally along the preset path.

Therefore, according to the intelligent mowing system, an intelligent mowing method is provided to set a virtual mowable area boundary 515A in a mowable area boundary 51. When the intelligent lawn mower 20 is inside the virtual mowable area boundary 515A, the method controls the intelligent lawn mower 20 to travel at a first speed; when the intelligent lawn mower 20 exceeds the virtual mowable area boundary 515A, the method controls the intelligent lawn mower 20 to travel at a second speed, wherein the second speed is less than the first speed.

When the intelligent lawn mower 20 is within the virtual mowable area boundary 515A, the controller controls the intelligent lawn mower 20 to travel at a first speed of 1 to 1.5 m/s; when the intelligent lawn mower 20 exceeds the virtual When mowing the boundary, the controller controls the intelligent lawn mower 20 to travel at a second speed of less than or equal to 0.5 m/s.

The virtual mowable area boundary 515A and the mowable area boundary 51 are spaced apart in the running or mowing direction by a distance greater than or equal to the product of the speed of the intelligent lawn mower 20 and the delay time. The distance between the virtual mowable area boundary 515A and the mowable area boundary 51 may be between 0.5 and 2 meters.

The intelligent lawn mower 20 also includes a path calibration module 422 communicatively coupled to the controller. The path calibration module 422 calibrates the path offset state of the intelligent lawn mower 20.

The mowable area boundary 51 is selected by one or a combination of a map simulation mode, a data selection mode, and a field routing mode. The intelligent lawn mower 20 further includes a mowing path generation module that generates a random or ordered mowing path in the mowable area boundary 51. The controller controls the intelligent lawn mower 20 to perform mowing along the mowing path.

It should be noted that, when planning the mowing path 53, a method of setting target positions proposed in an example could be used to set a plurality of target positions 55 on the virtual mowable area boundary 515A. Based on the plurality of target positions 55, the mowing path 53 could be generated within the mowable area boundary 51.

The intelligent mowing method employing the above solution can better match the intelligent lawn mower 20 with a real-time dynamic (RTK)-global GNSS navigation system. In an example of the present disclosure, the motor is a brushless DC motor, and the motor outputs an electrical signal such as a counter electromotive force, which changes periodically, that is, the periodic variation of the motor can be obtained by detecting a zero-crossing point of the motor back electromotive force. In an example of the present disclosure, the control unit at least estimates the traveling speed and/or displacement of the intelligent lawn mower 20 based on the periodic electrical signal output by the motor. Since the motor is associated with the at least one drive wheel 23 and drives the at least one drive wheel 23 to travel, the travel speed and/or speed-related displacement of the at least one drive wheel 23 can be obtained by a periodic signal of the motor, such as a counter electromotive force signal. Thus, the traveling speed and/or displacement of the intelligent lawn mower 20 are also available. Therefore, the example of the present disclosure does not require the installation of one or more sensors near the at least one drive wheel 23 to detect the rotational speed of the at least one drive wheel 23 to obtain the traveling speed and/or displacement of the intelligent lawn mower 20. Without the sensor to detect the rotational speed of the at least one drive wheel 23, the structure of the intelligent lawn mower 20 is simpler and the cost of the whole machine is reduced.

The following is an example illustration of how to estimate the traveling speed and/or displacement of the intelligent lawn mower 20 from obtaining the periodic back electromotive force electrical signal of the motor as an example.

When the control unit detects the zero-crossing of the back electromotive force, the counter is incremented by 1, so that the counter changes its state with the number of zero-crossing point of the electromotive force over time.

When the traveling speed of the intelligent lawn mower needs to be detected, it can be determined by the state change of the counter per unit time, the more characteristic points of the state change measured per unit time, the faster the speed; on the contrary, the fewer characteristic points of the state change measured per unit time, the slower the speed.

When the traveling displacement of the intelligent lawn mower needs to be detected, if the speed is constant, the number of characteristic points in each Δt time is the same, and the displacement from the starting point is proportional to the number of characteristic points since the starting point; if the speed is not constant, the number of characteristic points in each Δt time varies, and the displacement from the starting point depends on the two factors, speed and number of feature points. The minimum "base speed" and "base characteristic point" may be selected, and other speeds and feature points can be denoted by "base speed*correction factor" and "base characteristic point*correction factor".

The above is an example of how the speed measurement and/or the displacement measurement of the intelligent lawn mower 20 can be realized by detecting the periodic signal of the back electromotive force of the motor. In other examples of the present disclosure, the speed measurement and/or the displacement measurement of the intelligent lawn mower 20 can be realized by detecting characteristic points of periodically changed motor signals such as current and inductance.

What claimed is:

1. An intelligent mowing system, comprising:
   a base station configured to receive a satellite positioning signal sent by a satellite system, the satellite system at a fixed location; and
   an intelligent lawn mower, comprising:
      a cutting blade for cutting grass;
      a deck for supporting the cutting blade;
      at least one wheel rotatably supported by the deck;
      a first drive motor configured to provide a first torque to the at least one wheel;
      a second cut motor configured to provide a second torque to the cutting blade; and
      a display interface configured to display a mowing path in a map area;
   wherein the intelligent mowing system further comprises a mobile station group mounted on the intelligent lawn mower and communicated with the base station, the mobile station group being used to receive the satellite positioning signal sent by the satellite system during a movement process of the intelligent lawn mower, the mobile station group comprises a first mobile station and a second mobile station arranged at intervals, and a position and a direction of movement of the intelligent lawn mower is determined by the first mobile station and the second mobile station arranged at intervals;
- a lawn mower position generation module configured to communicate with the display interface to selectively display the position of the intelligent lawn mower in the map area of the display interface; and
- a controller electrically connected to or communicated with the display interface and the lawn mower position generation module, the controller being configured to control the movement process of the intelligent lawn mower to move within a predetermined line width according to a relative positional relationship between the position and direction of movement of the intelligent lawn mower and the mowing path.

2. The intelligent mowing system of claim 1, wherein the predetermined line width is greater than or equal to a distance between the first mobile station and the second mobile station.

3. The intelligent mowing system of claim 2, wherein the intelligent mowing system further comprises a path calibration module, the path calibration module being communicationally connected to the lawn mower position generation module and obtaining a path offset state of the intelligent lawn mower based on the satellite positioning signal and a preset algorithm in the lawn mower position generation module.

4. The intelligent mowing system of claim 3, wherein, when the path calibration module determines that the position of the intelligent lawn mower does not conform to the mowing path, the path offset state where the mobile station group is located within the predetermined line width of the mowing path is defined as a direction offset state, the path offset state where only one mobile station is located within the predetermined line width of the mowing path is defined as a partial offset state, and the path offset state where the mobile station group is located entirely outside the predetermined line width of the mowing path is defined as a complete offset state.

5. The intelligent mowing system of one of claim 4, wherein the path calibration module stores an algorithm to control the intelligent lawn mower to slow down or stop traveling in the direction offset state and calibrate the direction of movement of the intelligent lawn mower to a corresponding direction of the mowing path.

6. The intelligent mowing system of claim 5, wherein the path calibration module stores an algorithm to control the intelligent lawn mower to slow down and change a traveling direction towards the mowing path in the complete offset state and then repeat the obtaining of the path offset state.

7. The intelligent mowing system of claim 6, wherein the path calibration module stores an algorithm to control the intelligent lawn mower to slow down in the partial offset state and then repeat the obtaining of the path offset state once switched to the direction offset state or the complete offset state.

8. The intelligent mowing system of claim 7, wherein the path calibration module determines the direction offset state to be an online state, a converging state or a diverging state based on the position and direction of movement of the intelligent lawn mower and sets a calibration scheme for the online state to be speed down and calibrate direction and a calibration scheme for the converging state to be stop and calibrate direction, and a calibration scheme for the diverging state is to be stop and change direction and calibrate direction.

9. The intelligent mowing system of claim 3, wherein when the path calibration module determines that the position of the intelligent lawn mower does not conform to the mowing path, the path calibration module calculates a curve or straight line calibration path and controls the intelligent lawn mower to return to the mowing path.

10. The intelligent mowing system of claim 3, wherein the path calibration module determines the path offset state of the intelligent lawn mower according to an angle or distance between the intelligent lawn mower and the mowing path.

11. The intelligent mowing system of claim 3, wherein the path calibration module determines the path offset state of the intelligent lawn mower according to a relationship between a latitude and longitude coordinates of the intelligent lawn mower and a latitude and longitude coordinates of the predetermined line width.

12. The intelligent mowing system of claim 1, wherein the intelligent lawn mower further comprises a position sensor, the position sensor is communicationally connected to the controller, and detects the position and the direction of movement of the intelligent lawn mower, and the position sensor is selectively used in one or a combination of Gyro sensor, accelerometer, inertial measurement unit, barometer, magnetometer, and communication equipment.

13. An intelligent mowing system, comprising:
- a mobile terminal provided with a display interface configured to display a mowing path in a map area;
- an intelligent lawn mower, comprising:
  - a cutting blade for cutting grass;
  - a deck for supporting the cutting blade;
  - at least one wheel rotatably supported by the deck;
  - a drive motor configured to provide a first torque to the at least one wheel;
- wherein the intelligent mowing system comprises a mobile station group mounted on the intelligent lawn mower and communicated with a base station, the mobile station group being used to receive a satellite positioning signal sent by a satellite system during a movement process of the intelligent lawn mower, the mobile station group comprises a first mobile station and a second mobile station arranged at intervals, and a position and direction of travel of the intelligent lawn mower is determined by the first mobile station and the second mobile station arranged at intervals;
- a lawn mower position generation module configured to communicate with the display interface of the mobile terminal to selectively display the position of the intelligent lawn mower in the map area of the display interface; and
- a controller electrically connected to or communicated with the display interface and the lawn mower position generation module, the controller being configured to control the intelligent lawn mower to move within a predetermined line width according to a relative positional relationship between the position and direction of travel of the intelligent lawn mower and the mowing path.

14. The intelligent mowing system of claim 13, wherein the predetermined line width is greater than or equal to a distance between the first mobile station and the second mobile station.

15. The intelligent mowing system of claim 14, wherein the intelligent mowing system further comprises a path calibration module, the path calibration module being communicationally connected to the lawn mower position generation module and obtaining a path offset state of the intelligent lawn mower based on the satellite positioning signal and a preset algorithm in the lawn mower position generation module.

16. The intelligent mowing system of claim 15, wherein, if the path calibration module determines that the position of the intelligent lawn mower does not conform to the mowing path, the path offset state where the mobile station group is located within a predetermined line width of the mowing path is set as a direction offset state, the path offset state where only one mobile station is located within the predetermined line width of the mowing path is set as a partial offset state, and the path offset state where the mobile station group is located outside the predetermined line width of the mowing path is set as a complete offset state.

17. The intelligent mowing system of one of claim 16, wherein the path calibration module stores an algorithm to control the intelligent lawn mower to slow down or stop traveling in the direction offset state and calibrate the direction of movement of the intelligent lawn mower to a corresponding direction of the mowing path.

18. The intelligent mowing system of claim 17, wherein the path calibration module stores an algorithm to control the intelligent lawn mower to slow down and change a traveling direction towards the mowing path in the complete offset state and then repeat the obtaining of the path offset state.

19. The intelligent mowing system of claim 18, wherein the path calibration module stores an algorithm to control the intelligent lawn mower to slow down in the partial offset state and then repeat the obtaining of the path offset state once switched to the direction offset state or the complete offset state.

20. The intelligent mowing system of claim 19, wherein the path calibration module determines the direction offset state to be an online state, a converging state or a diverging state based on the position and direction of movement of the intelligent lawn mower and sets a calibration scheme for the online state to be speed down and calibrate direction and a calibration scheme for the converging state to be stop and calibrate direction, and a calibration scheme for the diverging state is to be stop and change direction and calibrate direction.

* * * * *